United States Patent [19]

Suzuki et al.

[11] Patent Number: 5,297,994

[45] Date of Patent: Mar. 29, 1994

[54] HYDRAULIC POWER TRANSMISSION JOINT WHICH IS USED IN VEHICLES

[75] Inventors: Satoru Suzuki, Kosai; Takehisa Yamada, Maisaka, both of Japan

[73] Assignee: Fuji Univance Corporation, Shizuoka, Japan

[21] Appl. No.: 993,046

[22] Filed: Dec. 18, 1992

[30] Foreign Application Priority Data

| Dec. 20, 1991 | [JP] | Japan | 3-338216 |
| Dec. 20, 1991 | [JP] | Japan | 3-338217 |
| May 6, 1992 | [JP] | Japan | 4-113279 |

[51] Int. Cl.⁵ .................. F04B 21/00; F16D 25/06
[52] U.S. Cl. ............................ 464/27; 464/106; 192/59; 60/413
[58] Field of Search .............. 464/24, 27, 106, 29; 192/59, 60, 61; 60/413; 74/866

[56] References Cited

U.S. PATENT DOCUMENTS

| 1,913,003 | 6/1933 | Shaff . | |
| 2,511,518 | 6/1950 | Stephens | 192/105 |
| 2,525,498 | 10/1950 | Naylor et al. | 103/161 |
| 2,619,868 | 12/1952 | Moore et al. | 84/484 |
| 2,808,739 | 10/1957 | Mueller | 74/711 |
| 2,827,859 | 3/1958 | Crane | 103/161 |
| 2,915,974 | 12/1959 | Enemark | 103/5 |
| 3,155,010 | 11/1964 | Johnson et al. | 91/175 |
| 3,230,795 | 1/1966 | Mueller | 74/711 |
| 3,393,583 | 7/1968 | Mueller | 74/711 |
| 3,468,263 | 9/1969 | Niemiec | 103/162 |
| 3,488,980 | 10/1969 | Burrough | 64/30 |
| 3,495,477 | 2/1970 | Mueller | 91/6.5 |
| 3,577,803 | 5/1971 | Mueller | 74/665 |
| 3,585,901 | 6/1971 | Moon, Jr. et al. | 91/16.5 |
| 3,664,474 | 5/1972 | Blake et al. | 192/56 F |
| 3,699,845 | 10/1972 | Ifield | 91/6.5 |
| 3,831,461 | 8/1974 | Mueller | 74/711 |
| 3,890,883 | 6/1975 | Rometsch et al. | 91/499 |
| 4,034,652 | 7/1977 | Huebner | 91/499 |
| 4,187,938 | 2/1980 | Miller | 464/29 X |
| 4,189,042 | 2/1980 | Miller | 464/29 X |
| 4,387,795 | 6/1983 | Mueller | 192/60 |
| 4,578,948 | 4/1986 | Hutson et al. | 60/487 |
| 4,676,336 | 6/1987 | Hiramatsu et al. | 180/233 |
| 4,719,998 | 1/1988 | Hiramatsu et al. | 192/0.033 |
| 4,776,257 | 10/1988 | Hansen | 92/12.2 |
| 4,934,251 | 6/1990 | Barker | 91/486 |
| 5,037,353 | 8/1991 | Suzuki et al. | 464/27 |
| 5,103,642 | 4/1992 | Suzuki et al. | 60/413 |

FOREIGN PATENT DOCUMENTS 594373  2/1978  U.S.S.R. .................. 192/59

Primary Examiner—Clifford D. Crowder
Assistant Examiner—John J. Calvert
Attorney, Agent, or Firm—Wenderoth, Lind & Ponack

[57] ABSTRACT

An electromagnetic actuator is provided at the outer periphery of and out of contact with a casing of a transmission joint for transmitting torque between two shafts. The electromagnetic actuator produces an electromagnetic field within the joint main body when an exciting current is supplied to a solenoid coil of the actuator. A movable magnetic ring is provided in the casing so as to be movable in the axial direction. The ring is moved in the axial direction by receiving an electromagnetic force induced by the field produced by the electromagnetic actuator. A relief valve connected to the ring is moved over an orifice of a pump, and a spring biasing the relief valve is compressed due to such movement, thereby establishing a relief pressure. When a rotational difference, created by the tires of the vehicle, occurs between the shafts of the joint, and an oil pressure of the pump rises while the joint is in a locked state in which the relief valve closes the orifice, the relief valve is opened, thereby limiting torque transmission to a predetermined value based on the relief pressure. Further, by opening a free valve also associated with the pump, the torque transmitting function of the pump rendered inoperative and a free state (2WD) occurs in which there is no torque transmission. A detecting coil is provided in parallel with the solenoid coil. After the solenoid coil is driven, the current value is changed. A change in magnetic flux according to a magnetic resistance in association with the movement of the movable magnetic ring occurs in the detecting coil. The position of the movable magnetic ring is discriminated from a voltage which is generated in the detecting coil in this instance.

18 Claims, 25 Drawing Sheets

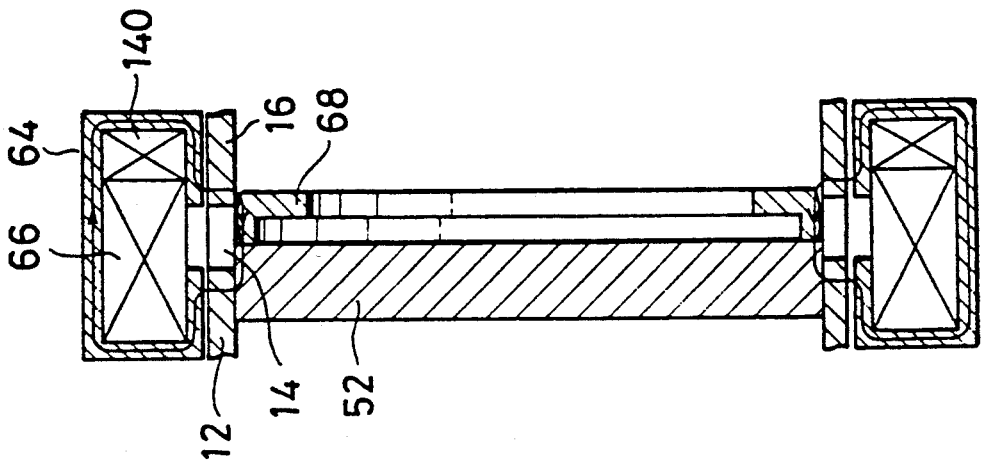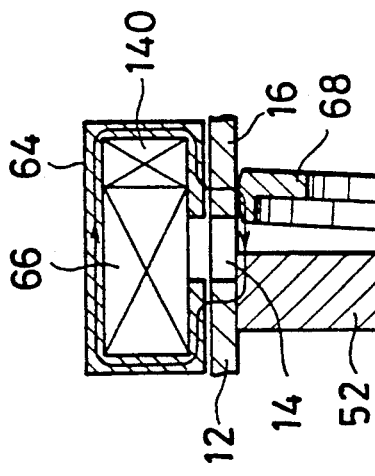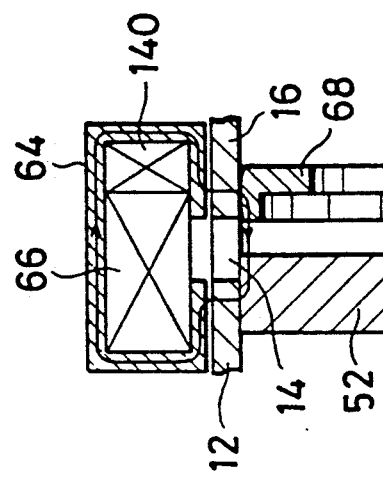

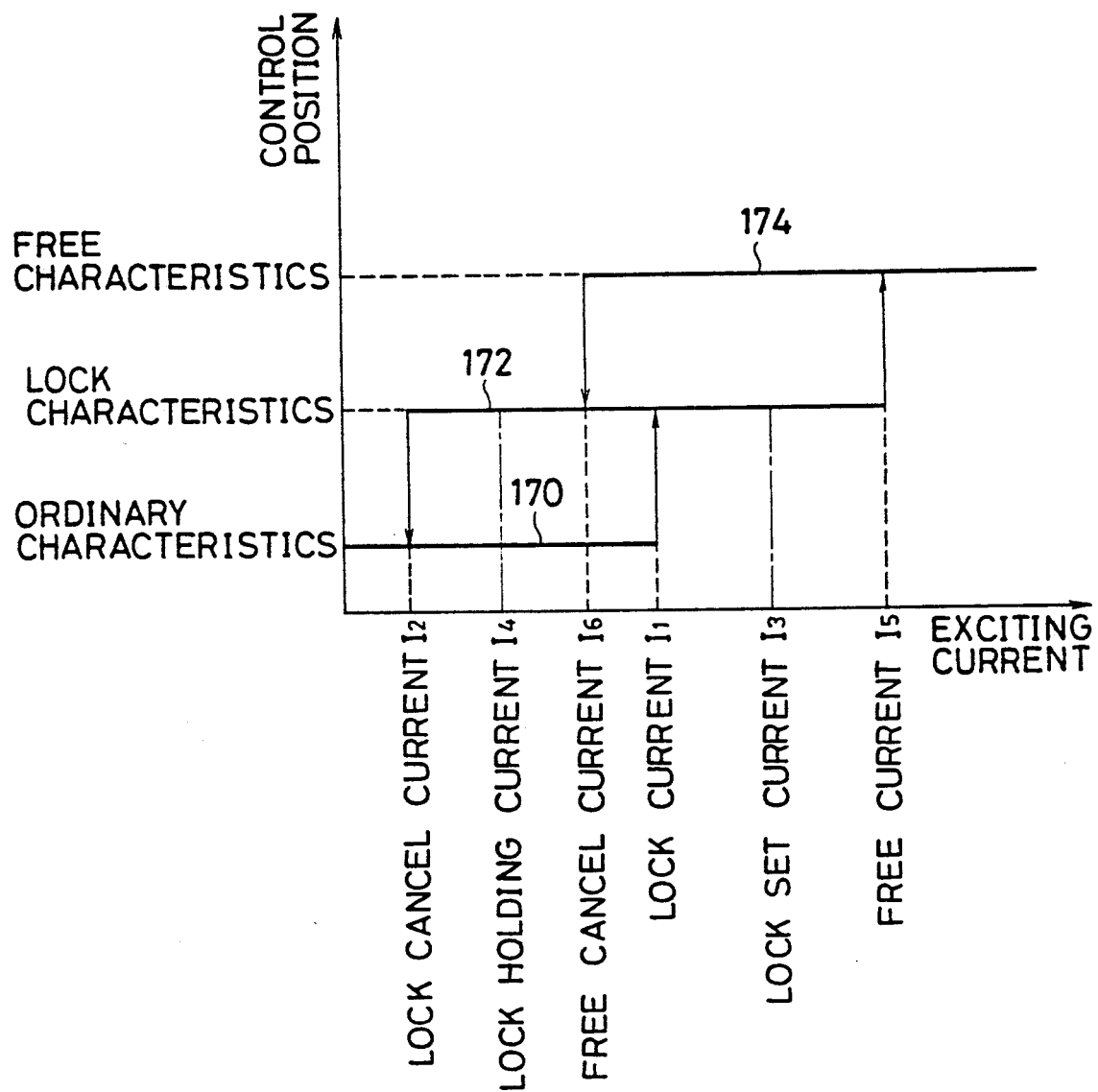

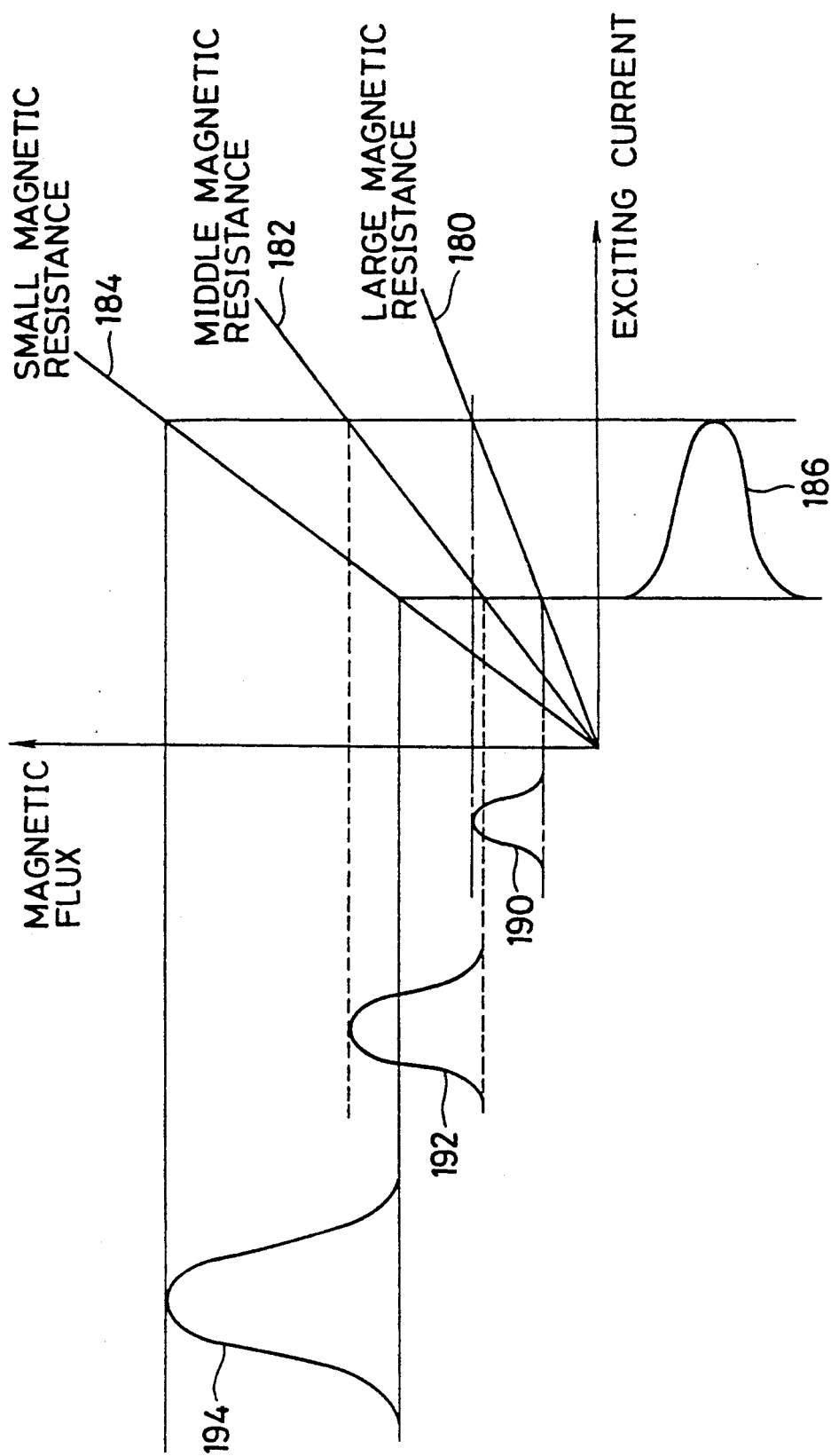

HYDRAULIC POWER TRANSMISSION JOINT WHICH IS USED IN VEHICLES

BACKGROUND OF THE INVENTION

The invention relates to a hydraulic power transmission joint which is used to distribute a driving force of a vehicle and, more particularly, to a hydraulic power transmission joint which can freely control the transmission of torque to create a difference between rotational speeds of two power rotary shafts.

The present inventors have already disclosed in U.S. Pat. No. 5,037,353 such a transmission joint in which a plurality of plungers are arranged in the axial direction of the joint and in U.S. Pat. No. 5,103,642 such a transmission joint using a rotary valve.

In such a power transmission joint, an orifice is arranged in a path along which liquid is discharged by a plunger of a pump to an intake side of the pump, a high pressure is generated on the discharge side of the pump by the resistance offered by the orifice to the flow of the fluid, and the movement of the plunger is suppressed by the high pressure. Under such a condition torque is transmitted between two rotary shafts according to a rotational speed difference between the two rotary shafts.

In the above apparatus, the degree of opening of the orifice is fixed. However, if the degree to which the orifice was open could be changed, even in cases of the same rotational speed difference, the characteristics of the torque to be transmitted could be freely controlled.

When a vehicle is running off-road, it is desirable that the orifice be completely closed such that the joint assumes a locked state in which the motive power is transmitted to both the rear and front wheels whereby the vehicle is in a 4WD mode.

When the vehicle runs on a dry paved road, in order to reduce fuel consumption, it is desirable that the pump be rendered inoperative such that the joint assumes a free state in which torque is not transmitted, whereby the vehicle is in a 2WD mode.

For this purpose, a lock valve which can open and close the orifice or a free valve for rendering the pump temporarily inoperative are necessary.

In this case, it is necessary to provide an electromagnetic actuator or the like in order to make the degree to which the orifice is open variable or to actuate a free valve from outside of the joint.

The joint itself is coupled to two power transmission shafts. On the other hand, the electromagnetic actuator is connected to a controller by a signal line and is driven by an electric signal, so that the electromagnetic actuator needs to be fixed relative to the power transmission joint. Because a device for varying the effective opening of the orifice or a free valve of the rotating joint is driven by the fixed electromagnetic actuator, the structure of the overall apparatus is large.

When adjusting the degree of opening of the orifice with the electromagnetic actuator, it is necessary to switch a valve between at least open and closed positions. Further, switching at three or more levels is also required. It is generally sufficient to provide a plurality of electromagnetic actuators in order to effect such switching at the various levels. However, when such actuators are used, the apparatus is large and too complicated.

Since the valves provided in the joint are far from the electromagnetic actuator, in order to generate a sufficient electromagnetic driving force, a large solenoid coil is needed. Thus, the apparatus is large and consumes a large amount of electric power.

Further, it is difficult to provide the apparatus with a check for whether a valve provided in the joint has actually operated in accordance with a control signal. Reliability is thus poor. Although it is desirable to detect for a deviation of the valve from its normal operation, since parts of the joint are rotating and the valve mechanism is located in the joint, it is difficult to provide mechanical or optical devices for carrying out such detection. On the other hand, even if such a detecting capability is provided, it gives rise to increased costs of the apparatus.

SUMMARY OF THE INVENTION

It is an object of the invention to provide a hydraulic power transmission joint in which the relief pressure provided by a relief valve, which keeps constant a torque that is generated by flow resistance offered by an orifice, can be operated by a small electromagnetic actuator in a non-contact state with the joint.

Another object of the invention is to provide a hydraulic power transmission joint which can adjust the relief pressure provided by a relief valve with even a small coil of an electromagnetic actuator.

Still another object of the invention is to provide a hydraulic power transmission joint in which a ring-shaped driving member provided in a casing is driven by an electromagnetic force produced outside the casing to thereby operate a relief valve which changes torque transmitting characteristics of the joint.

Another object of the invention is to provide a hydraulic power transmission joint in which a ring-shaped driving member provided in a casing becomes inclined relative to the axial direction of a joint by an electromagnetic force produced outside the casing or in which an inclined ring-shaped driving member becomes oriented perpendicular to the axial direction, to thereby establish a relief pressure with a relief valve.

Another object of the invention is to provide a hydraulic power transmission joint in which a ring-shaped driving member provided in a casing becomes inclined relative the axial direction by a weak electromagnetic force produced outside the casing to thereby establish the relief pressure with a relief valve and is moved parallel to the axial direction by a strong electromagnetic force to thereby operate a free valve which places the joint in a free state.

Another object of the invention is to provide a hydraulic power transmission joint in which a closed orifice will produce an increase in oil pressure when there is an increase in differential rotational speed between shafts of the joint, whereupon a relief valve will be opened when the pressure reaches a relief pressure so that an increase in torque is suppressed to a predetermined value which is established by the relief pressure, thereby preventing the joint from breaking.

Another object of the invention is to provide a hydraulic power transmission joint which can prevent a tight corner braking phenomenon when the vehicle runs while the joint is in a locked state.

Another object of the invention is to provide a hydraulic power transmission joint in which a detection coil is provided near a solenoid coil of an electromagnetic actuator and an operating position of a valve is detected based on a change in magnetic resistance.

Another object of the invention is to provide a hydraulic power transmission joint in which after a driving current has been supplied to a solenoid coil of an electromagnetic actuator, the value of the driving current is changed to within a range in which a valve mechanism won't be moved, and the position of the valve mechanism can be detected from a signal which is derived from a detection coil.

Another object of the invention is to provide a hydraulic power transmission joint in which after an operating current has been supplied to a solenoid coil of an electromagnetic actuator, the current is reduced to a holding current value which maintains the driving member in an operative position, and this position is detected from a signal derived from a detection coil.

That is, according to the invention, there is provided a hydraulic power transmission joint for use in vehicles, in which two power transmission shafts are relatively rotatably coupled and when a rotational speed difference occurs between the shafts, a torque corresponding to the rotational speed difference is transmitted between the shafts.

According to the hydraulic power transmission joint, a hydraulic pump such as a plunger pump or the like is provided between an input shaft and an output shaft which can rotate relative to one another, and an orifice which offers resistance to fluid flow and a relief valve which establishes a relief pressure are provided in a passage placing a discharge port of the hydraulic pump mechanism in communication with an intake port. The relief valve preferably comprises a conical valve member.

An electromagnetic actuator is provided around the outer periphery of a casing, constituting a joint main body, in a contactless state. The electromagnetic actuator is fixed to an outside member and generates a magnetic field within the joint main body when an exciting current is supplied to a solenoid coil of the actuator. A magnetic ring, which serves as the above-mentioned driving member, is supported in the casing so as to be movable in the axial direction of the joint and to be freely inclined relative to the axial direction.

When there is no electromagnetic driving force, the magnetic ring is oriented perpendicular to the shaft. When a driving force, which is parallel to the axial direction, is received along the entire periphery of the ring as produced by a weak magnetic field of the electromagnetic actuator, the ring is inclined because one circumferential portion thereof is supported as a fulcrum, and another circumferential portion thereof, located symmetrically to the one circumferential portion with respect to the axial center of the ring, is free to move in the axial direction. A spring of the relief valve is compressed by such an inclination causing the relief valve to be seated over the orifice, whereby the orifice is closed until a relief pressure is generated by the pump.

The magnetic ring closes the orifice with the relief valve when the magnetic ring is at its most inclined position, thereby setting the joint in a locked state.

The relief pressure is set to a value which corresponds to a value equal to or higher than the torque at which a tire will slip while running on a rough road and is equal to or lower than the torque at which the tire will slip while running on a paved road. Therefore, even when the vehicle suddenly starts to run while the joint is erroneously left in the locked state and an excessive torque is applied to the joint, the relief valve is forced opened by the generated pump pressure, the pump oil pressure is regulated to a predetermined relief pressure, and the torque doesn't exceed a constant torque which is determined by the relief pressure. Thus, the joint can be prevented from breaking.

Even if the vehicle runs on a paved road while the joint is in the locked state, only a torque smaller than that at which the tire will slip on a paved road is generated due to the operation of the relief valve. Therefore, a tight corner braking phenomenon can be mitigated as compared with the case where the hydraulic pump mechanism is completely locked.

Further, because the relief valve has a conical valve member it won't stick as much as a spool valve having a cylindrical valve member. It is thus possible to prevent a dangerous condition in which relief valve cannot operate when the joint is in the locked state.

Furthermore, a free valve can establish a 2WD mode by rendering the torque transmitting function of the pump inoperative. The free valve places the discharge side and the intake side of the hydraulic pump in communication and is provided in parallel with the orifice with which the relief valve is associated. When a strong magnetic field is produced by the electromagnetic actuator, the magnetic ring moves in parallel to the axial direction of the joint and opens the free valve, thereby rendering the pump ineffective.

Further, the detection coil forms part of magnetic circuit with the solenoid coil. The position of the magnetic ring is discriminated on the basis of the relation between the exciting current which is supplied to the solenoid coil and the voltage which is generated in the detection coil. Practically speaking, after an exciting current to drive the magnetic ring to a predetermined position has been supplied to the solenoid coil, the exciting current is reduced to a holding current value by which the ring can be held at a set position. The set position is determined by the voltage generated in the detection coil associated with the reduction of the exciting current.

The above and other objects, features, and advantages of the present invention will become more apparent from the following detailed description made with reference to the drawings.

BRIEF DESCRIPTION OF THE DRAWINGS

FIGS. 22A, 22B, and 22C are explanatory diagrams showing magnetic circuits in three different operational states;

FIG. 23 is a characteristic diagram showing the relation between the exciting current and the control characteristics;

FIG. 24 is a characteristic diagram showing the relation between the exciting current and the magnetic flux, in which a magnetic resistance is used as a parameter.

DETAILED DESCRIPTION OF THE PREFERRED EMBODIMENTS

Figure 1:
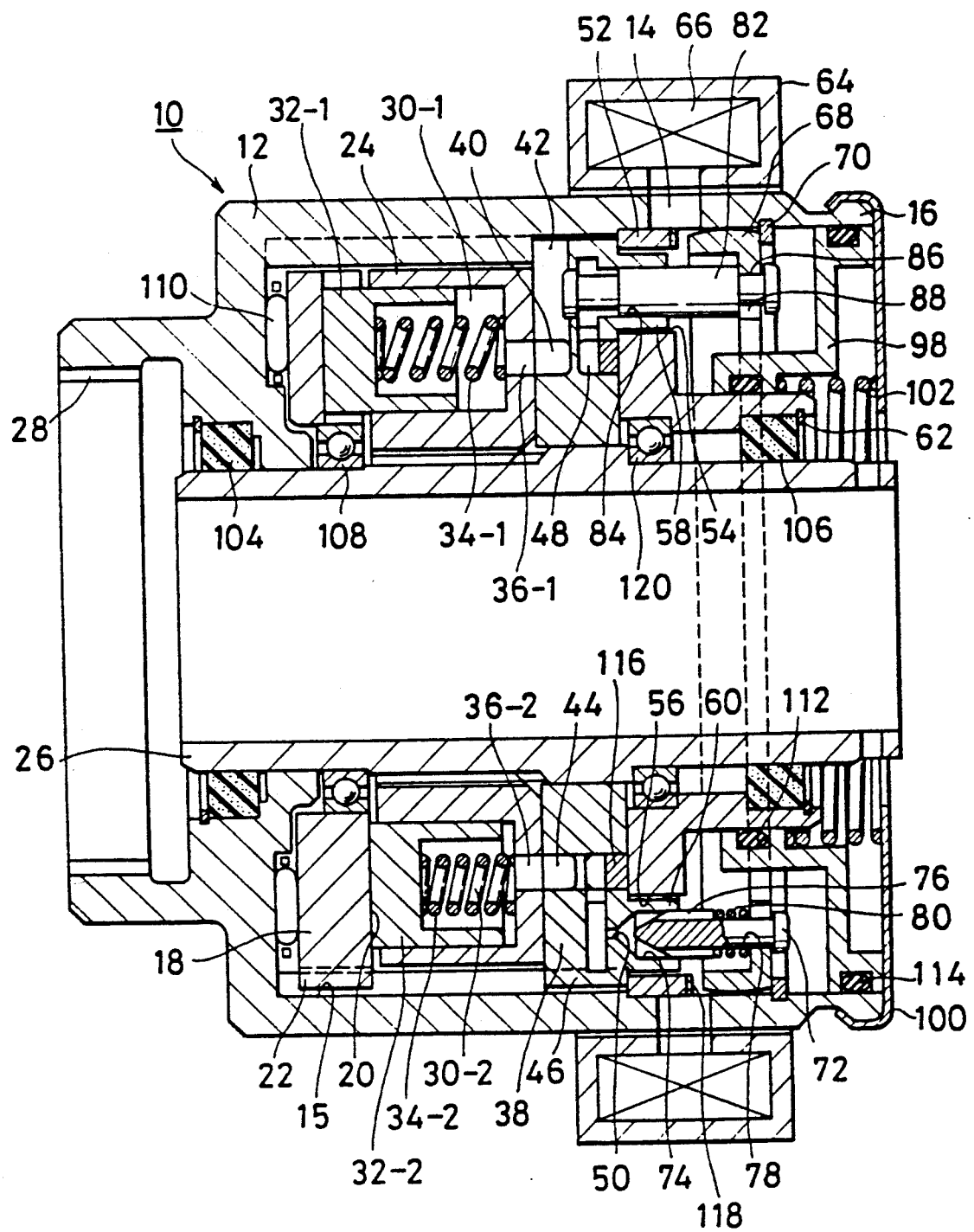
FIG. 1 is a cross-sectional view of the first embodiment of the transmission joint according to the present invention.

In FIG. 1, a housing 10 includes members 12, 14, and 16. Although the members 12 and 16 are made of a magnetic material, the member 14 is made of a non-magnetic material such as nickel-chromium alloy or the like. A spline 28 is formed on an inner surface on the left side of the housing 10. The spline 28 is coupled to an output shaft (not shown) and rotates integrally with the output shaft.

A cam 18 is provided in the housing 10. The cam 18 is supported inside the housing 10 by a bearing 108 and a needle bearing 110 so as to be rotatable by only a predetermined angle. The cam 18 has a cam surface 20 which defines a plurality of cam mountains and cam valleys. A plurality of projections 22 are formed at a plurality of positions on the outer periphery of the cam 18 adjacent those portions of the cam surface 20 where there are cam mountains.

The projections 22 are received within notches 15 formed on the housing 10, so that the cam 18 rotates integrally with the housing 10 in the rotating direction of a rotor 24. When the rotating direction of the rotor 24 changes, the cam 18 may also rotate with the rotor 24 in the new direction. After the cam 18 has rotated in the new direction and once the projection 22 of the cam 18 abuts a portion of the housing 10 defining a notch 15, the cam 18 rotates integrally with the housing 10.

The rotor 24 is enclosed in the housing 10. The rotor 24 is coupled to an input shaft 26 by a splined engagement and rotates integrally with the input shaft 26. An oil seal 104 which is positioned by a stopper ring is arranged between the outer peripheral surface on the left side of the input shaft 26 and the casing 10.

Plunger chambers 30-1 and 30-2 formed in the rotor 24 ar cylindrical and extend in the axial direction of the joint. A plurality of other plunger chambers are provided at radial positions in addition to the plunger chambers 30-1 and 30-2. Plungers 32-1 and 32-2 are slidably fitted in the plunger chambers 30-1 and 30-2 through return springs 34-1 and 34-2. A plurality of intake/discharge holes 36-1 and 36-2 are formed in the rotor 24 so as to communicate with the plunger chambers 30-1 and 30-2.

In FIG. 1, the plunger 32-1 is in an intake position and the plunger 32-2 is in a discharge position.

An intake port 40, an intake passage 42, and a discharge port 44 are formed in a rotary valve 38. The rotary valve 38 is positioned and fixed to the housing 10 by a projection 46 received within the notch 15 of the housing 10.

The discharge port 44 communicates with a high pressure chamber 48. The high pressure chamber 48 can communicate with the intake port 40 through an orifice 50 formed in the rotary valve 38.

When the plunger is in the intake position, as is the plunger 32-1, the intake port 40 of the rotary valve 38 and the intake/discharge hole 36-1 of the rotor 24 ar in such a positional relation as to communicate with each other. Consequently, oil can be sucked into the plunger chamber 30-1 through the orifice 50, intake passage 42, intake port 40, and intake/discharge hole 36-1 of the rotor 24.

When the plunger is in the discharge position, as is plunger 32-2, a positional relation opposite to that in the intake position is obtained. The intake/discharge hole 36-2 of the rotor 24 communicates with the discharge port 44 of the rotary valve 38 and with the high pressure chamber 48.

A detailed structure of the cam 18, rotor 24, plungers 32-1 and 32-2, and rotary valve 38 has been disclosed in U.S. Pat. No. 5,103,642.

A magnetic retainer 52 is provided adjacent to the rotary valve 38. The outside of the retainer 52 is fixed to the inner periphery of the housing 10. The input shaft 26 is fitted to the inside of the retainer 52 through a bearing 120, so that the retainer 52 rotates integrally with the housing 10. Inserting holes 54 and 56 are formed in the retainer 52 at symmetrical positions. Projecting portions 58 and 60 of the rotary valve 38 are inserted into the inserting holes 54 and 56, respectively. An oil seal 106 is provided between the retainer 52 and the input shaft 26 and is fixed by a snap ring 62 so as to prevent the oil seal from being pulled out.

The electromagnetic actuator is constructed of a magnetic frame 64 and a solenoid coil 66. The magnetic frame 64 is fixed to an external member (not shown) and is held adjacent the outside of the housing 10 in a contactless state. The magnetic frame is positioned so that the member 14 of the housing 10 made of a non-magnetic material is located at the center of the frame and so that the frame is arranged coaxially with the shaft of the joint. The solenoid coil 66 is enclosed in the magnetic frame 64. An exciting current is supplied from a control unit (not shown in FIG. 1) to the solenoid coil 66.

A movable magnetic ring 68 (driving member) is provided in the casing 10 surrounded by the magnetic frame 64 in which the solenoid coil 66 is enclosed. The movable magnetic ring 68 faces the retainer 52 and is enclosed in the housing 10 so as to be movable in the axial direction. Further, the outer peripheral surface of the ring 68 has a spherical shape, thereby enabling the ring 68 to be inclined obliquely relative to the shaft.

The ring 68 is magnetized by the current supplied to the solenoid coil 66 so as to create a magnetic attracting force between the ring 68 and the retainer 52. Further, the movement of the ring 68 to the right is restricted by providing a stopper ring 70 along the inner periphery of the housing 10.

A non-magnetic spacer ring 118 serving as a contact preventing member is provided on the right surface of the retainer 52. The spacer ring 118 will not allow the ring 68 to directly come into contact with the retainer 52 even when the ring 68 moves upon the supplying of current to the solenoid coil 66. The non-magnetic spacer ring 118 can be alternatively provided on the movable magnetic ring 68.

By providing the non-magnetic spacer ring 118, the movable magnetic ring 68 is prevented from being attracted to the retainer 52 by the residual magnetism when the current flowing in the solenoid coil 66 is shut off. By providing the non-magnetic spacer ring 118, on the other hand, a cheap steel material of inferior magnetic characteristics can be used as a material of the housing 10, retainer 52, and movable magnetic ring 68.

A relief valve 72 is provided in a portion of the rotary valve 38, retainer 52, and ring 68. The relief valve 72 has a conical valve member which faces the orifice 50. A plurality of grooves 76 are formed in the outer periphery of the valve member as extending in the axial direction of the valve member.

One end of the relief valve 72 is slidably fitted in a valve hole 74 of the rotary valve 38 adjacent the orifice 50. The other end of the relief valve 72 is fitted in a notch 78 formed in the ring 68. A spring 80, exerting a load corresponding to a relief pressure, is interposed between the relief valve 72 and the ring 68.

The ring 68 generates a magnetic attracting force when current is supplied to the solenoid coil 66. When the relief valve 72 closes the orifice 50, and once pressure in the high pressure chamber 48 exceeds a predetermined relief pressure that is established by the load exerted by the spring 80, the relief valve 72 is moved to the right and opens the orifice 50 to keep the oil pressure in the high pressure chamber 48 at the relief pressure.

The relief pressure corresponds to, for instance, a value which is equal to or larger than a torque at which a tire will slip when the vehicle is running on a rough road and is equal to or less than a torque at which a tire will slip when the vehicle is running on a paved road.

A free valve 82 having a spool is provided at a position which is diametrically opposite the relief valve 72 with respect to the shaft. One end of the free valve 82 is slidably fitted in a valve hole 84 of the rotary valve 38. A grooved portion 86 formed at the other end of the free valve 82 is fitted into a notch 88 formed in the movable magnetic ring 68. The free valve 82 partitions the high pressure chamber 48 of the rotary valve 38 and the intake port 40. When the ring 68 is magnetically attracted to the retainer 52 and is moved in its entirety to the left by the current supplied to the solenoid coil 66, the high pressure chamber 48 communicates with the intake port 40, thereby creating a free state in which no torque is transmitted between the input and output shafts.

Figure 2:
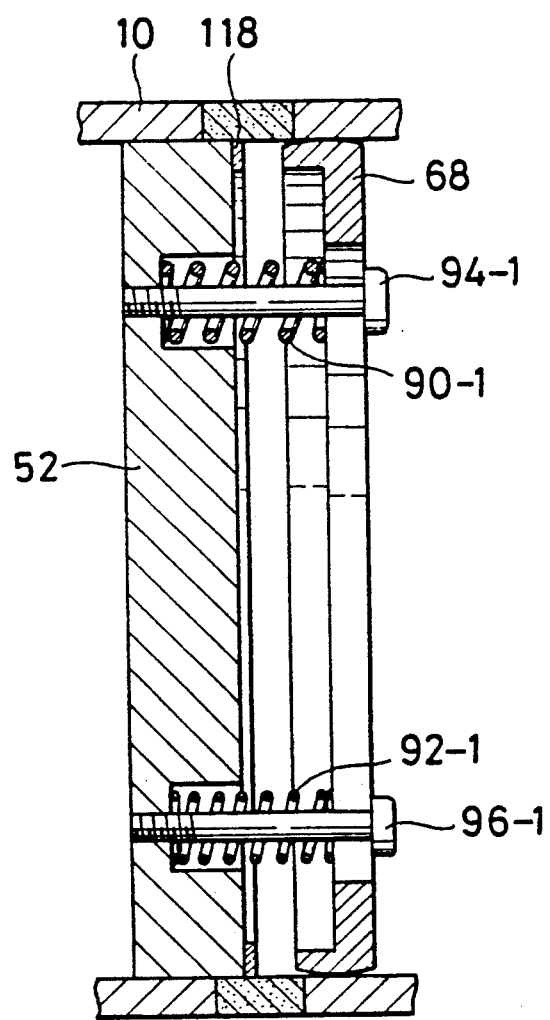
FIG. 2 is a cross-sectional view of a movable magnetic ring and a retainer used in the embodiment of FIG. 1.
Figure 3:
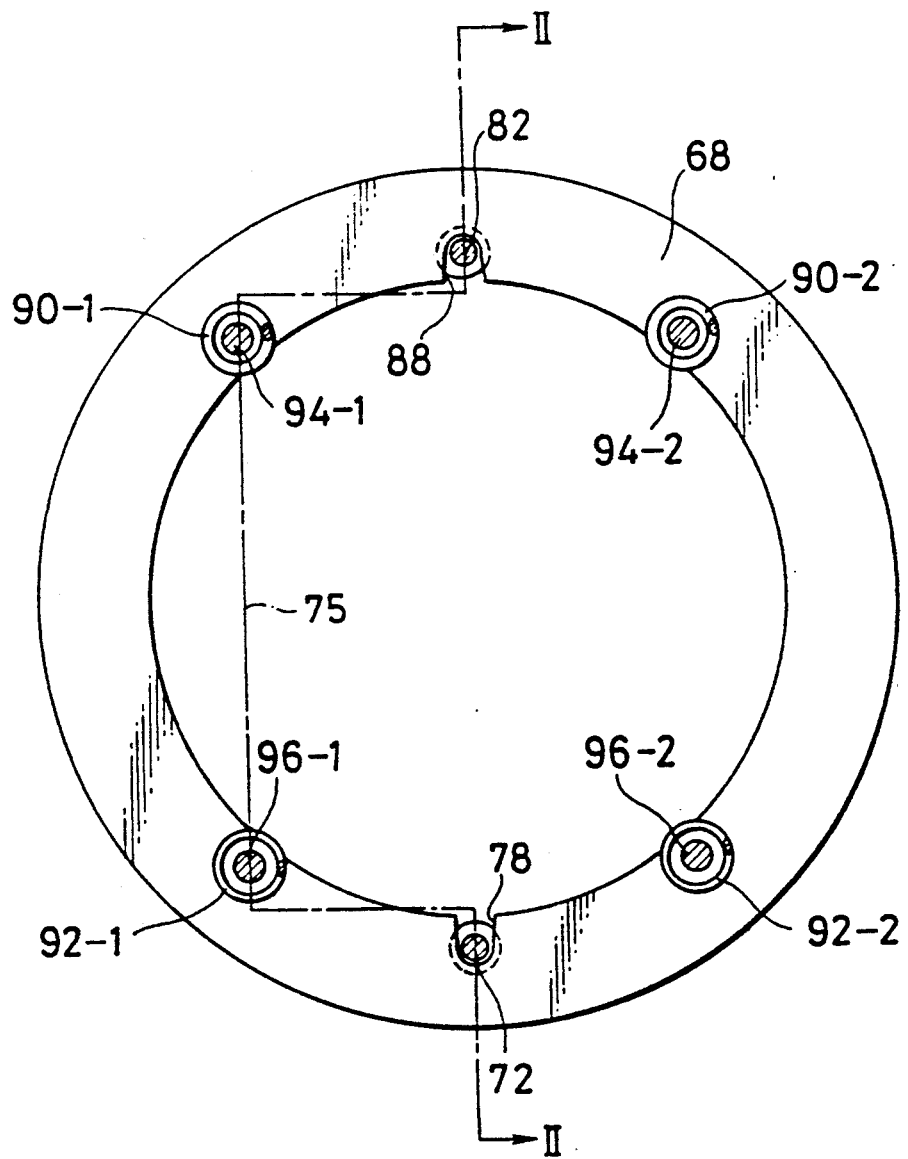
FIG. 3 is a front view of the movable magnetic ring.

As shown in FIGS. 2 and 3, springs 90-1 and 90-2 each exerting a strong urging force are interposed between the retainer 52 and the movable magnetic ring 68 at two upper locations, respectively. Springs 92-1 and 92-2 each exerting a comparatively weak urging force are interposed between the same at two lower positions, respectively. The springs 90-1 and 90-2 are associated with pull-out preventing bolts 94-1 and 94-2, which are threadably engaged with the retainer 52 and extend through respective holes in the ring 68. The springs 92-1 and 92-2 are also associated with pull-out preventing bolts 96-1 and 96-2, which are threadably engaged with the retainer 52 and extend through respective holes in the ring 68.

The springs 90-1 and 90-2 and the springs 92-1 and 92-2 are provided at symmetrical positions with respect to the center of the ring 68, respectively. The free valve 82 is provided between the springs 90-1 and 90-2. The relief valve 72 is provided between the springs 92-1 and 92-2.

The relief valve 72 and the free valve 82 are located at symmetrical positions with respect to the center of the ring 68.

Returning to FIG. 1, an accumulator piston 98 made of a non-magnetic material is provided at the right side of the housing 10. The accumulator piston 98 rotates integrally with the housing 10 and is provided to accommodate for the thermal expansion of oil in a sealed chamber. The accumulator piston 98 is protected by a cover 100 fixed to the housing 10. A return spring 102 is arranged between the accumulator piston 98 and the cover 100.

The operation will now be described.

Figure 4C:
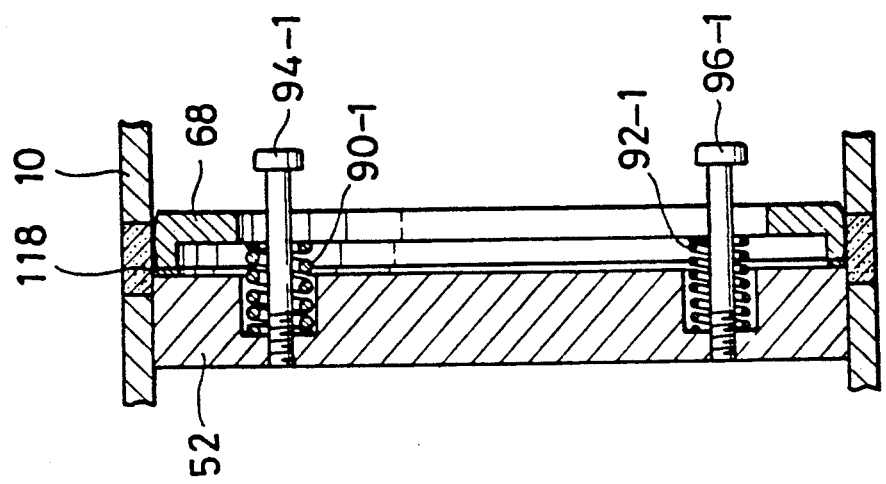
FIGS. 4A, 4B, and 4C are views similar to FIG. 2 showing the operation of the movable magnetic ring.
Figure 4B:
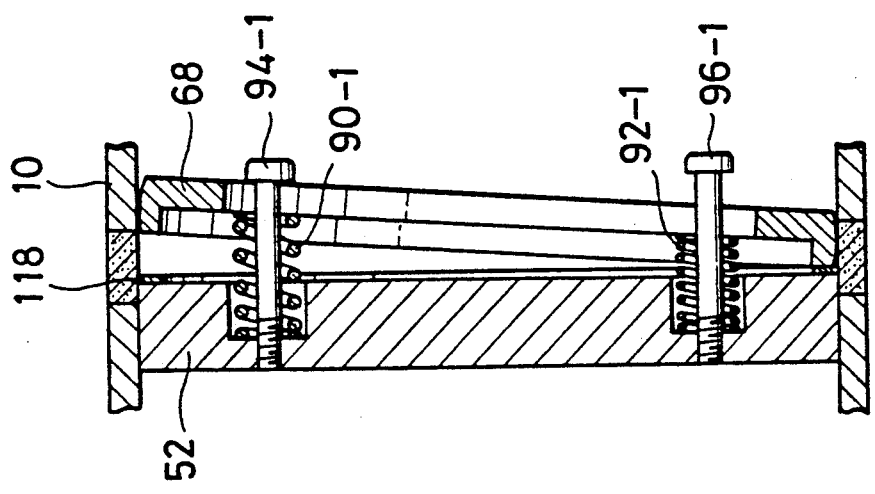
Figure 4A:
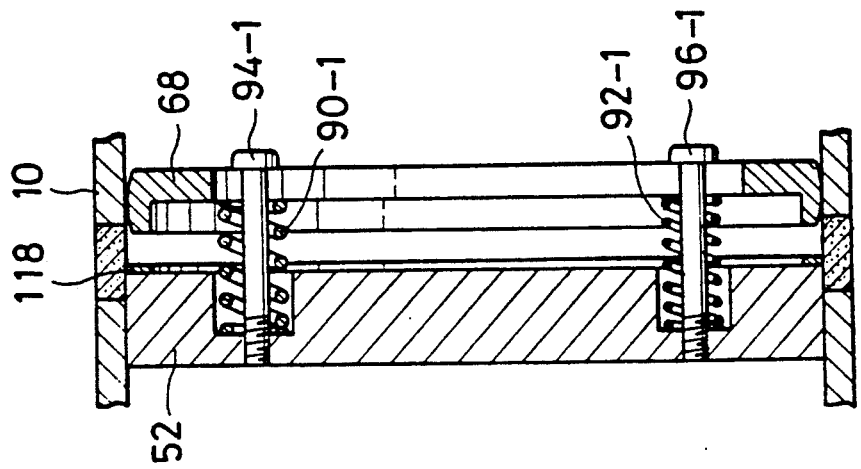
Figure 5:
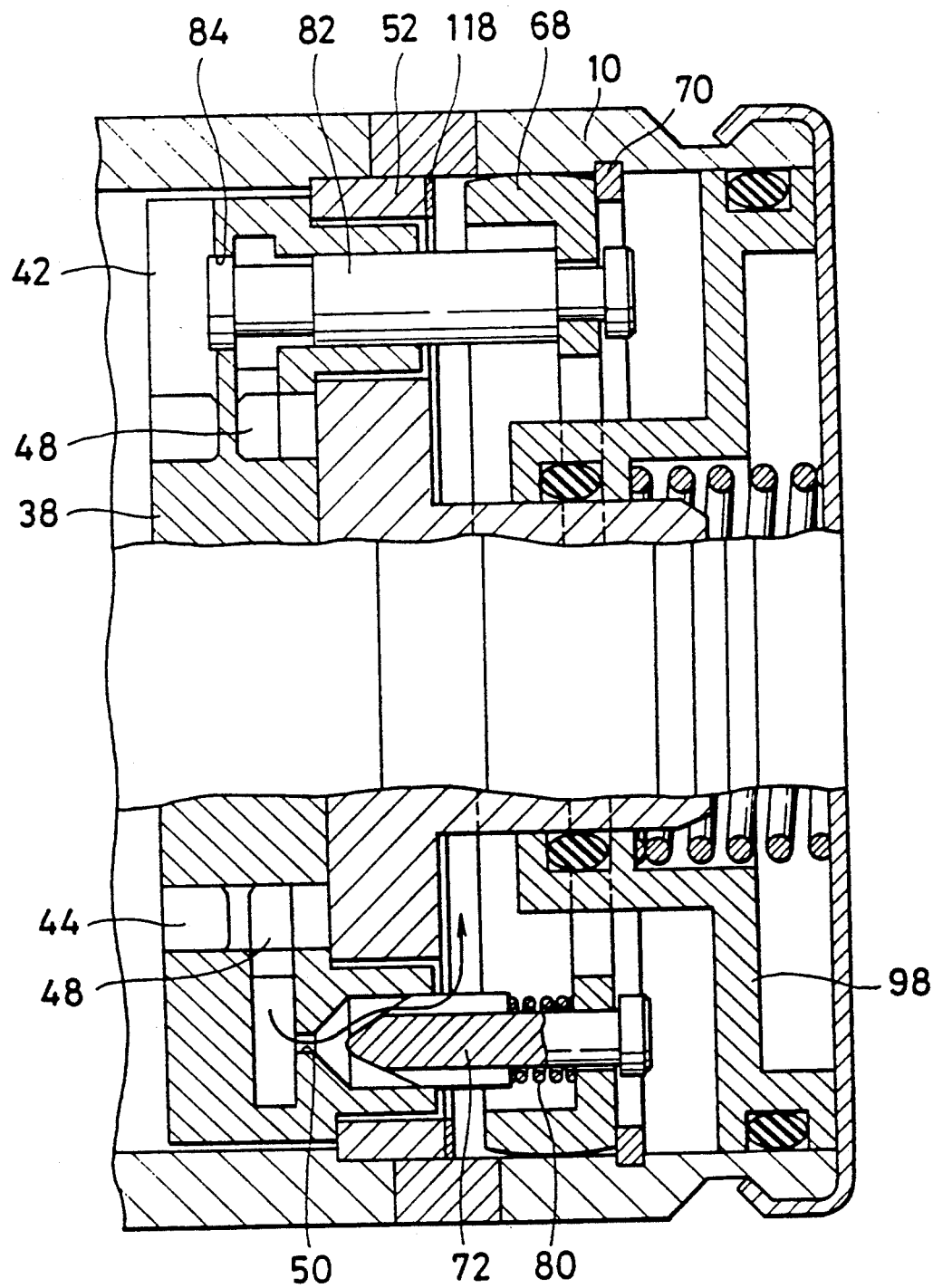
FIG. 5 is a cross-sectional view of a portion of the transmission joint of a relief valve and a free valve in a normal operating state.

When no current is supplied to the solenoid coil 66, as shown in FIG. 4A, the movable magnetic ring 68 doesn't generate a magnetic attracting force and is held at the position shown in the diagram. Therefore, the springs 90-1 and 90-2 are not compressed. As shown in FIG. 5, consequently, the free valve 82 is held in a state in which the valve hole 84 (which places the high pressure chamber 48 in communication with the intake port 42) is closed.

On the other hand, since the relief valve 72 opens the orifice 50, the oil flows as shown by an arrow. That is, the oil pushed out through the discharge port 44 passes through the high pressure chamber 48 and the orifice 50 and is supplied to the intake port 42. In this instance, oil pressure in the high pressure chamber 48, discharge port 44, and plunger chamber 30-2 increases due to the resistance offered by the orifice 50, and a reaction force is generated on the plunger 32-2. Because the cam 18 rotates on the plunger 32-2 on which the reaction force is generated, a torque is generated between the cam 18 and the rotor 24.

Figure 6:
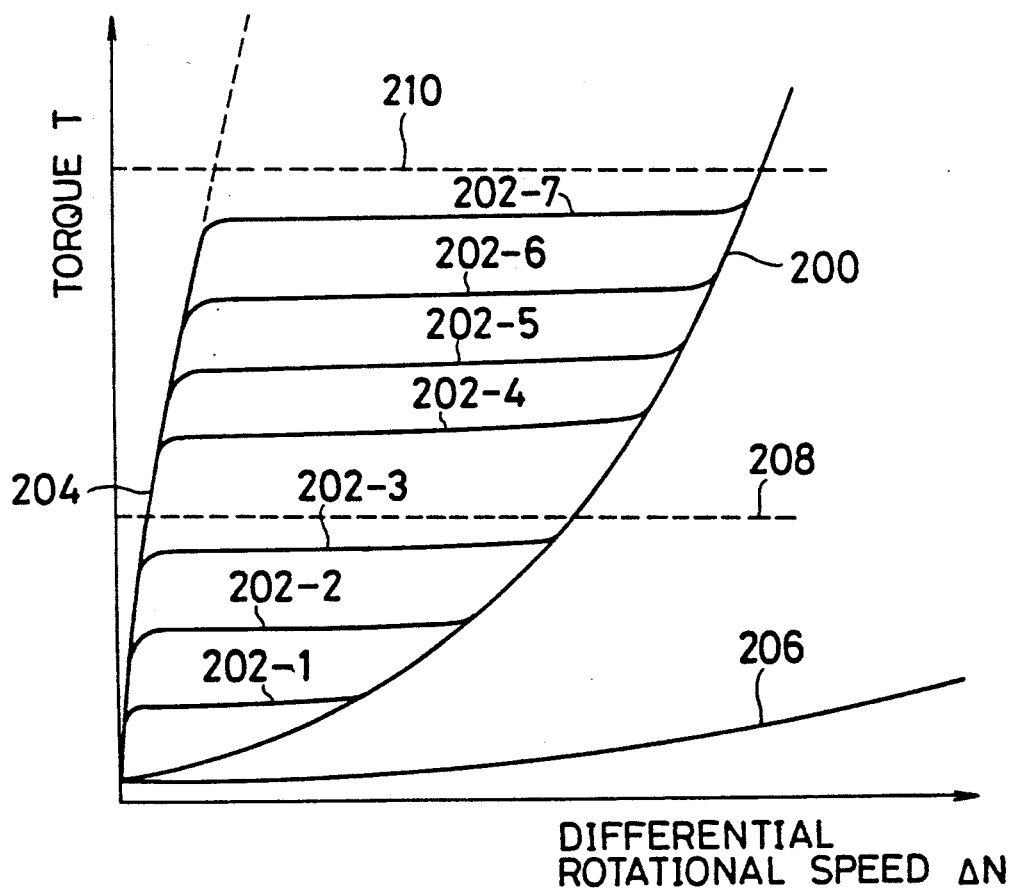
FIG. 6 is a characteristic diagram showing the relation of a transmission torque to a differential rotational speed in the first embodiment.

The torque characteristics in this instance are shown by a curve 200 in FIG. 6. A torque T which is proportional to the square of a differential rotational speed $\Delta N$ is obtained.

The operation of the relief valve 72 will now be described. The torque characteristics based on the operation of the relief valve 72 and as represented by, for instance, curves 202-1, 202-2, ..., 202-7 in FIG. 6 are obtained in accordance with a magnitude of the exciting current.

When a weak exciting current is supplied to the solenoid coil 66 so that the movable magnetic ring 68 generates a force exceeding a set load of the spring 80, the torque characteristics shown by the curve 202-7 in FIG. 6 are derived. In this case, however, the exciting current is not great enough to cause the free valve 82 to open.

Figure 7:
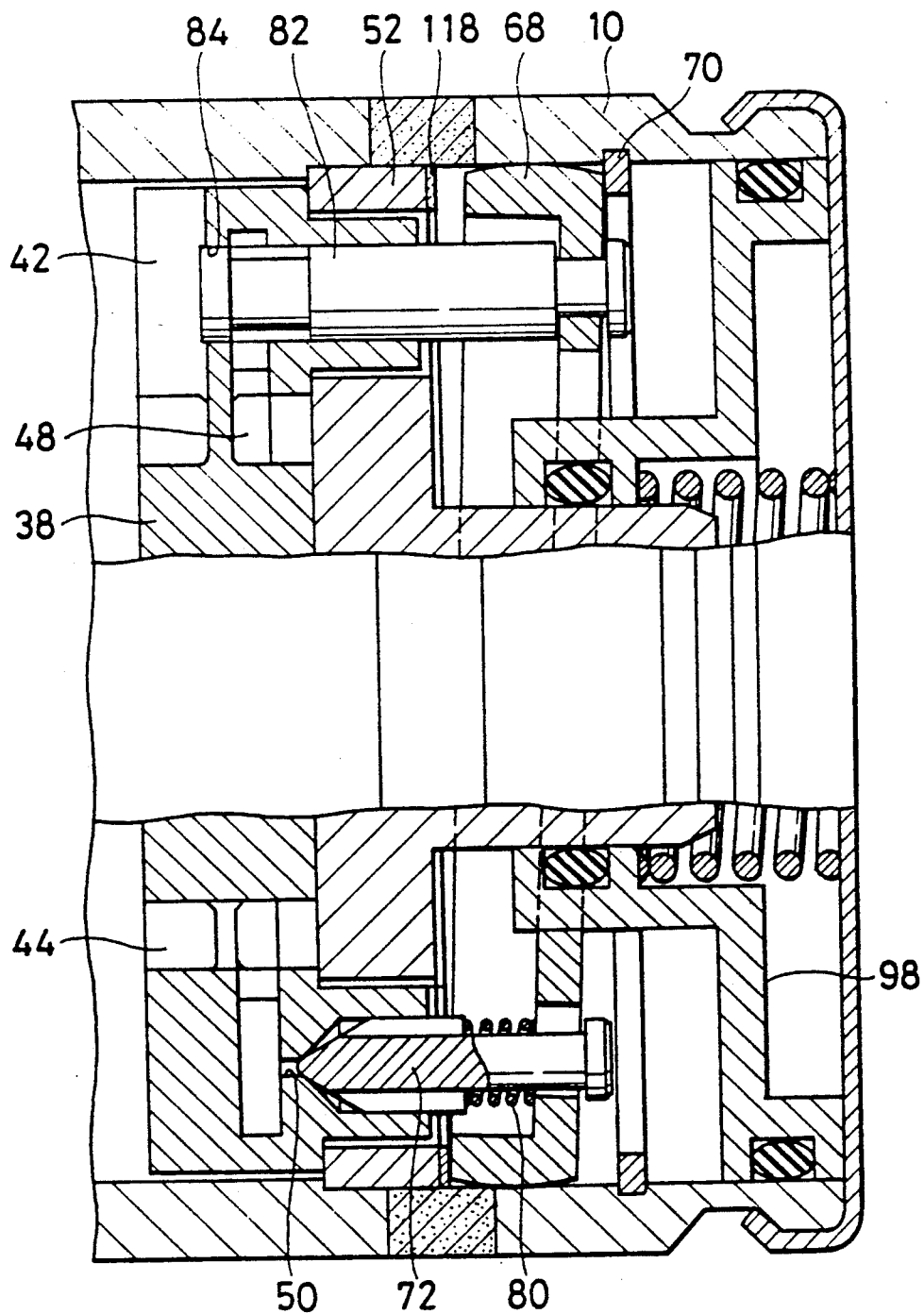
FIG. 7 is a cross-sectional view of a portion of the transmission joint showing a state in which the joint is locked by the relief valve.

When the weak exciting current supplied to the solenoid coil 66 causes the ring 68 to generate a force exceeding the set load of the spring 80, and generates a magnetic attracting force between the retainer 52 and the ring 68 which is insufficient to compress the strong springs 90-1 and 90-2, the lower side of the ring 68 rotates about the upper side serving as a fulcrum as shown in FIG. 7. The ring 68 is inclined until it compresses the spring 80 and comes into contact with the retainer 52. In this state, the relief pressure, determined by the load exerted by the spring 80, is established by the relief valve 72. In this instance, if a differential rotation doesn't occur, the relief valve 72 continues to close the orifice 50.

When a differential rotation begins to occur and the oil pressure in the high pressure chamber 48 rises, the relief valve 72 closes the orifice 50 so long as a force that is applied to the relief valve 72 by the oil pressure does not reach the relief pressure which is determined by the load exerted by the spring 80. The torque characteristics in this case are shown by a curve 204 in FIG. 6. By separating the discharge side and the intake side of the pump with the free valve 82, the plungers 32-1 and 32-2 of the pump are fixed relative to the rotor 24, so that a locked state (4WD state) in which the input and output shafts are directly coupled is obtained.

Figure 8:
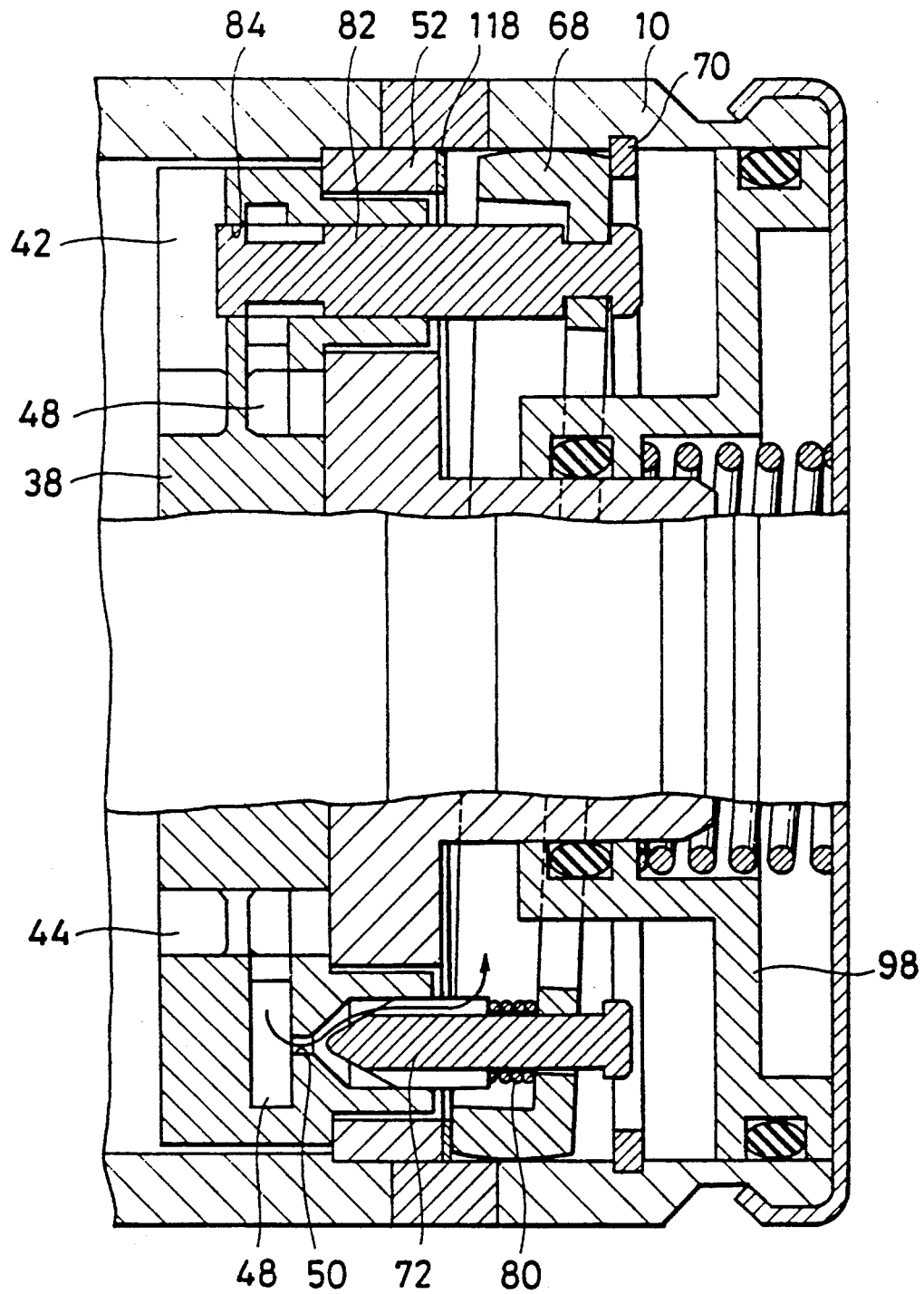
FIG. 8 is a similar cross-sectional view showing the locked state being released by a pump oil pressure.

When the differential rotation further increases while the joint is in the locked state and the oil pressure in the high pressure chamber 48 exceeds the relief pressure which is determined by the load exerted by the spring 80, as shown in FIG. 8, the relief valve 72 moves backward and opens the orifice 50 and torque characteristics corresponding to the relief pressure and as represented by the curve 202-7 in FIG. 6 are obtained. Namely, even when the differential rotational speed ΔN increases, the relief valve 72 moves to a position dictated by the load of the spring 80 and the fluid force which is received from the oil passing through the orifice 50 so as to tend to keep the oil at a predetermined relief pressure. A predetermined transmission torque which is based on the relief pressure and is represented the curve 202-7 in FIG. 6 is thus maintained and an increase in transmission torque is suppressed.

The load of the spring 80 is selected so as to set a relief pressure which will provide the torque characteristics lying within a range between a value which is equal to or larger than a straight line 208 representing the limit at which the tire will start to slip when the vehicle is running off-road and a value which is equal to or less than a straight line 210 representing the limit at which the tire will start to slip when the vehicle is running on a paved road.

Therefore, even when the vehicle suddenly starts to run while the operating state is erroneously held in the locked state and an excessive torque is applied to the joint, the oil pressure is relieved, the transmission torque is limited, and the ordinary torque characteristics can be obtained. Thus, the joint can be prevented from breaking.

Since the torque characteristics of values between the straight lines 208 and 210 of FIG. 6 are obtained, a tight corner braking phenomenon which occurs when the vehicle moves onto a paved road while the joint is in the locked state can be reduced.

Further, since the relief valve 72 uses a conical valve member, the valve member will not stick decreasing the possibility of the locked state being maintained in error.

Now an operation will be described in the case where a weak exciting current, which produces a force on the movable magnetic ring 68 equal to or less than the load of the spring 80, is supplied to the solenoid coil 66.

In this case, a relief pressure which gives rise to the torque characteristics shown any of the curves 202-1 to 202-6 in FIG. 6 is set in accordance with the exciting current. That is, when an arbitrary weak exciting current is supplied to the solenoid coil 66, a force is generated which rotates the lower side of the ring 68 about the upper side thereof as a fulcrum. However, since only a force which is equal to or smaller than the set load of the spring 80 is generated, the spring 80 functions as a rigid body. The driving force of the ring 68 is applied as it is to the relief valve 72, thereby setting a relief pressure.

Now, assuming that no differential rotation has occurred, the lower portion of the movable ring 68 is positioned close to the retainer 52 and the relief valve 72 having moved together with the spring 80 thereby closes the orifice 50.

When a differential rotation begins to occur and the oil pressure in the high pressure chamber 48 rises, the relief valve 72 closes the orifice 50 until the force which is applied to the relief valve 72 by the oil pressure reaches the force generated by the movable magnetic ring 68. Until this occurs, the locked state (4WD state) is maintained in which the input and output shafts are directly coupled.

When the differential rotation further increases while the joint is in the locked state, and the oil pressure in the high pressure chamber 48 exceeds the relief pressure that is determined by the force generated by the ring 68, the relief valve 72 moves backward together with the spring 80 and pushes the lower portion of the ring 68. The relief valve 72 is moved to a position which is dictated by the force generated by the ring 68 and the fluid force which is received from the oil passing through the orifice 50. The torque characteristics of the curves 202-1 to 202-6 in FIG. 6 which maintain a predetermined transmission torque that corresponds to the relief pressure are obtained in accordance with the exciting current.

The characteristics in the free state will now be described. When a strong exciting current is supplied to the solenoid coil 66, as shown in FIG. 4C, the movable magnetic ring 68 simultaneously compresses not only the weak springs 92-1 and 92-2 but also the strong springs 90-1 and 90-2 and moves to a state in which the entire ring 68 is in contact with the retainer 52.

Figure 9:
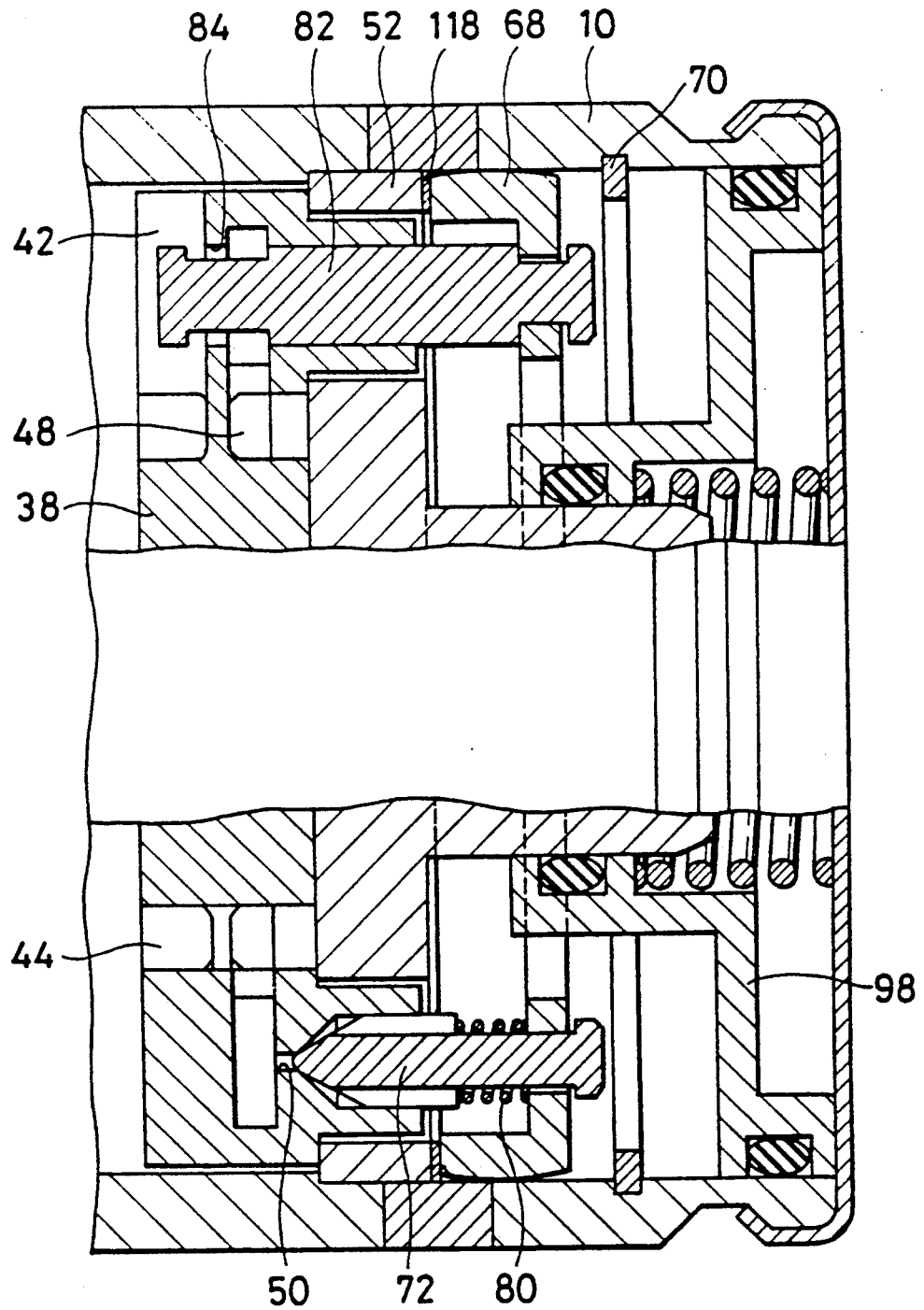
FIG. 9 is a cross-sectional view showing a state in which the free valve is open.

As shown in FIG. 9, therefore, the relief valve 72 blocks the orifice 50. The free valve 82 opens the valve hole 84 which places the high pressure chamber 48 in communication with the intake port 40. Accordingly, the oil in the high pressure chamber 48 flows into the intake port 40 without passing through the orifice 50. The torque characteristics in this instance are shown by the curve 206 in FIG. 6. A free state (2WD state) in which the torque is hardly transmitted between the input and the output shafts is derived.

Figure 10:
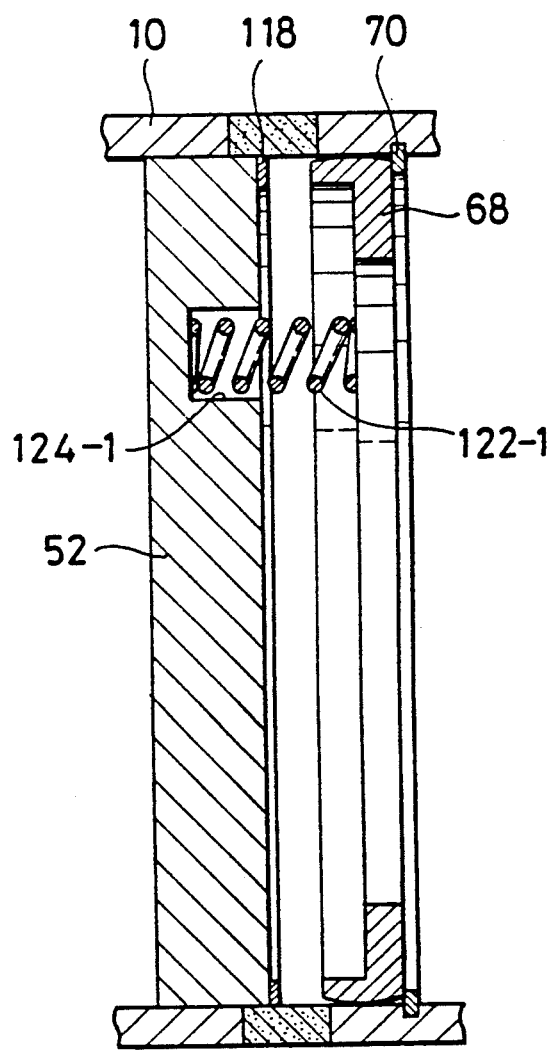
FIG. 10 is a cross-sectional view similar to FIG. 2 but showing a modification of the movable magnetic ring.
Figure 11:
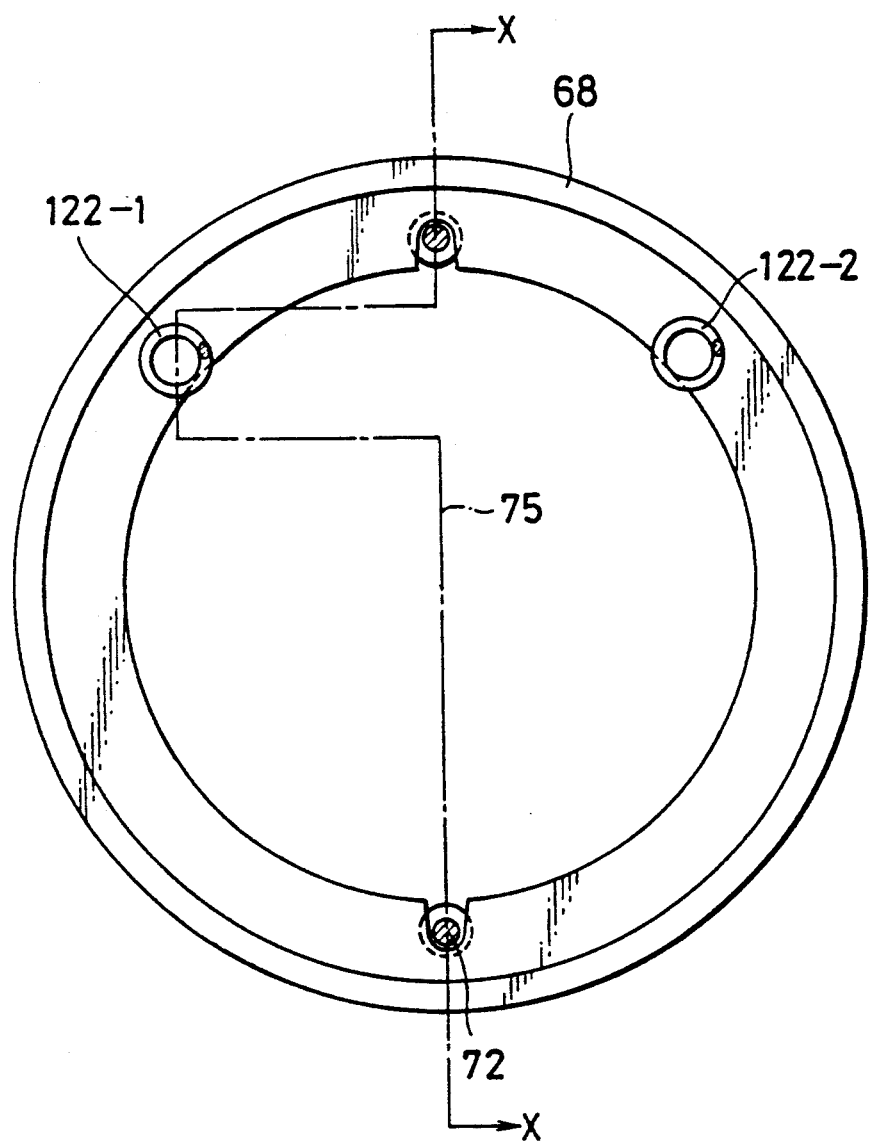
FIG. 11 is a front view of the movable magnetic ring shown in FIG. 10.

FIGS. 10 and 11 show a modification of the embodiment shown in FIGS. 2 and 3. As springs which are provided between the retainer 52 and the movable magnetic ring 68, only springs 122-1 and 122-2 exerting a strong urging force are provided and only at the upper portion of the ring 68. The springs 122-1 and 122-2 are arranged at upper positions which are symmetrical with respect to a vertical line passing through the center of the movable magnetic ring 68. As shown in FIG. 10, the springs 122-1 and 122-2 are positioned by respectively inserting respective ends thereof into holes 124-1 and 124-2 formed in the retainer 52. In this case, weak springs at the lower portions of the retain 52 and ring 68 are unnecessary.

Figure 12:
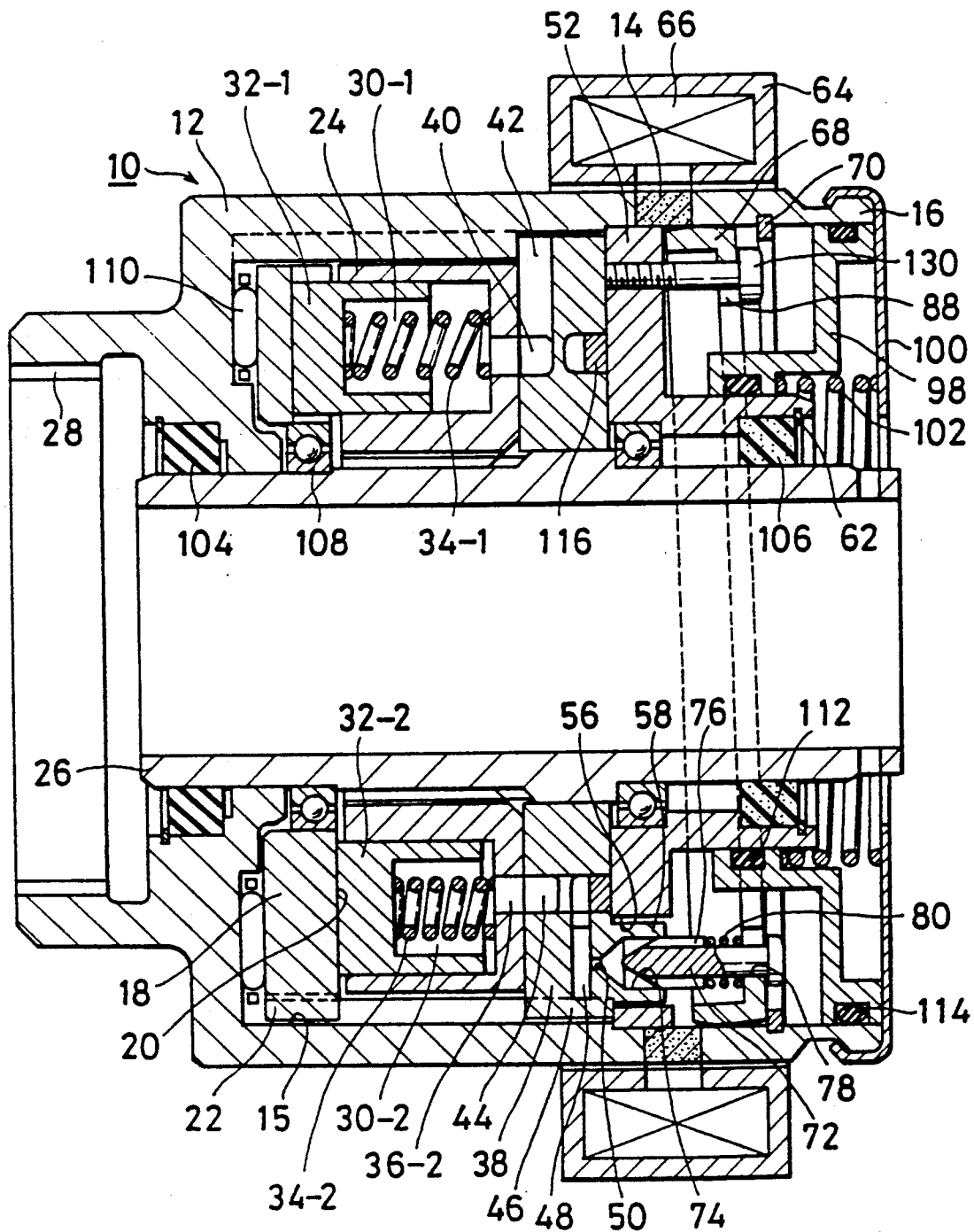
FIG. 12 is a cross-sectional view of the second embodiment of the transmission joint according to the present invention.

FIG. 12 shows the second embodiment of the invention. The second embodiment differs from the first embodiment of FIG. 1 in that the free valve 82 in FIG. 1 is eliminated. The other structure is substantially the same as that of the first embodiment.

Figure 13:
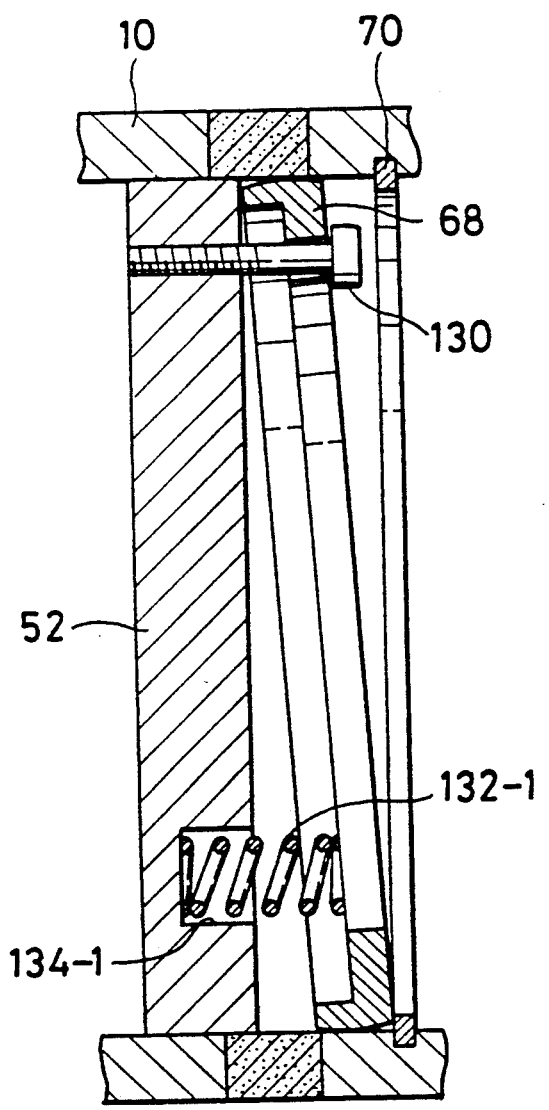
FIG. 13 is a cross-sectional view of a movable magnetic ring and a retainer used in the embodiment of FIG. 12.
Figure 14:
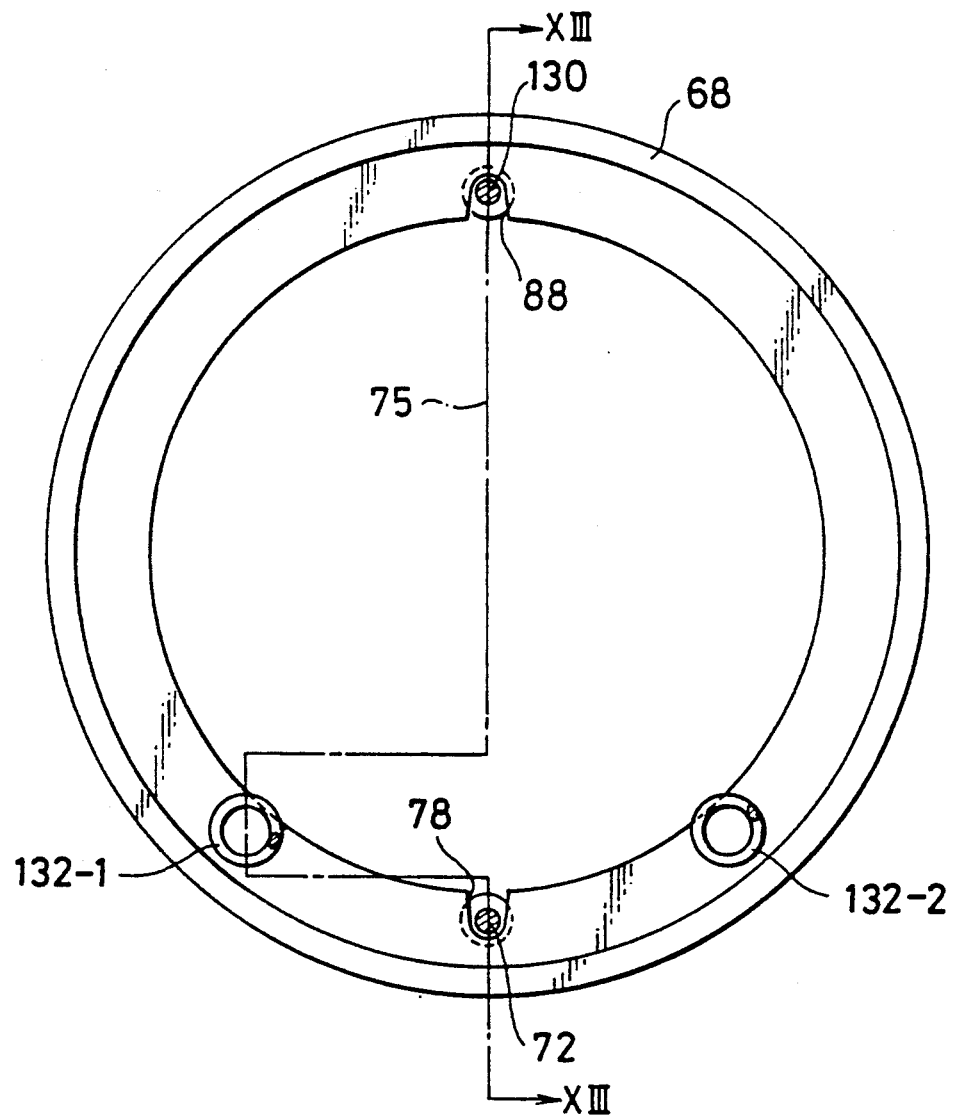
FIG. 14 is a front view of the movable magnetic ring shown in FIG. 13.

In FIGS. 13 and 14, a pull-out preventing bolt 130 is threaded into the upper portion of the retainer 52. The notch 88 of the movable magnetic ring 68 receives the shaft portion of the bolt 130, thereby preventing the ring from being pulled out. Weak springs 132-1 and 132-2 are inserted into two holes 134-1 and 134-2 in the lower portion of the retainer 52.

Therefore, the movable magnetic ring 68 is slidably supported in a state in which the lower portion thereof is pressed by the springs 132-1 and 132-2 and is inclined about the bolts 130 serving as a fulcrum.

The operation will now be described.

Figure 15A:
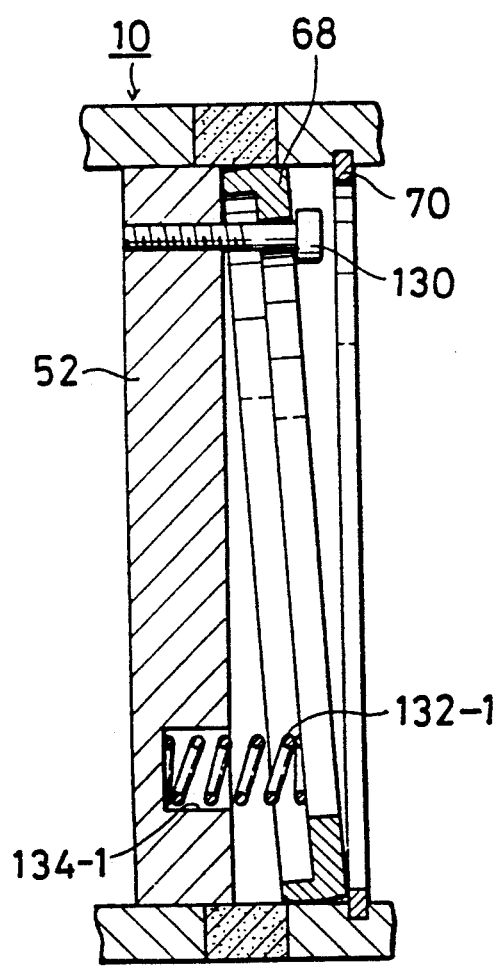
FIGS. 15A and 15B are views similar to FIG. 13 and show the operation of the movable magnetic ring in the second embodiment.

When no current is supplied to the solenoid coil 66, as shown in FIG. 15A, the movable magnetic ring 68 doesn't generate a magnetic attracting force and is held at the position shown in the diagram. Therefore, the spring 132-1 is not compressed. That is, the ring 68 is held in a state in which it is inclined and attached to the retainer 52 by the pull-out preventing bolt 130.

Figure 16:
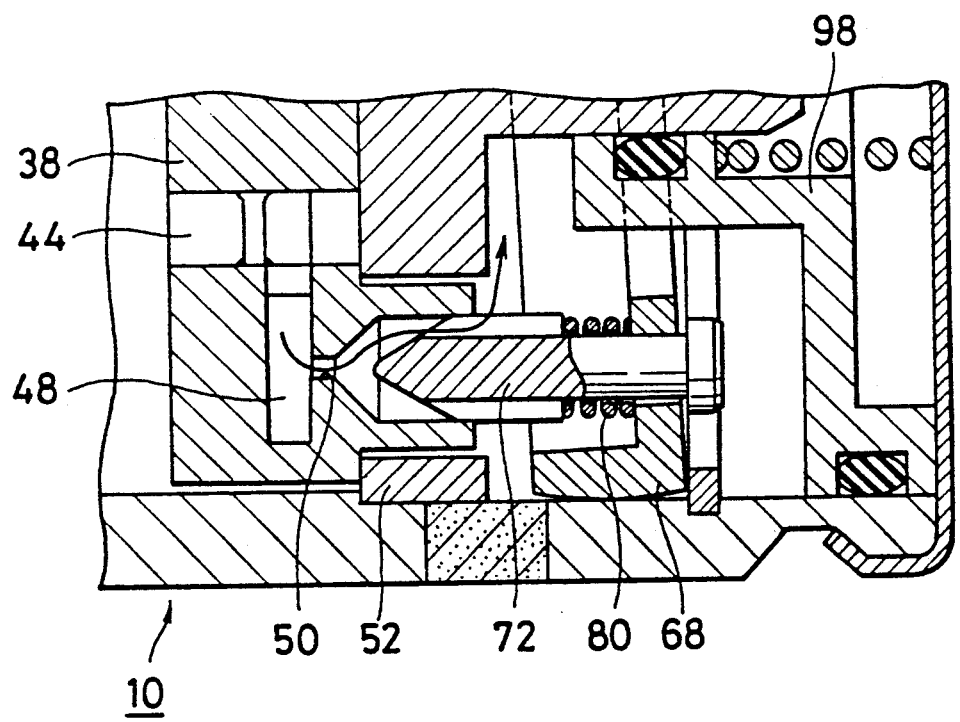
FIG. 16 is a cross-sectional view of a portion of the transmission joint showing a relief valve in a normal operating state in the second embodiment.

Therefore, as shown in FIG. 16, since the relief valve 72 opens the orifice 50, the oil flows as shown by an arrow. The torque characteristics in this instance are shown by the curve 200 in FIG. 17. The torque T which is proportional to the square of the differential rotational speed ΔN is obtained.

Figure 15B:
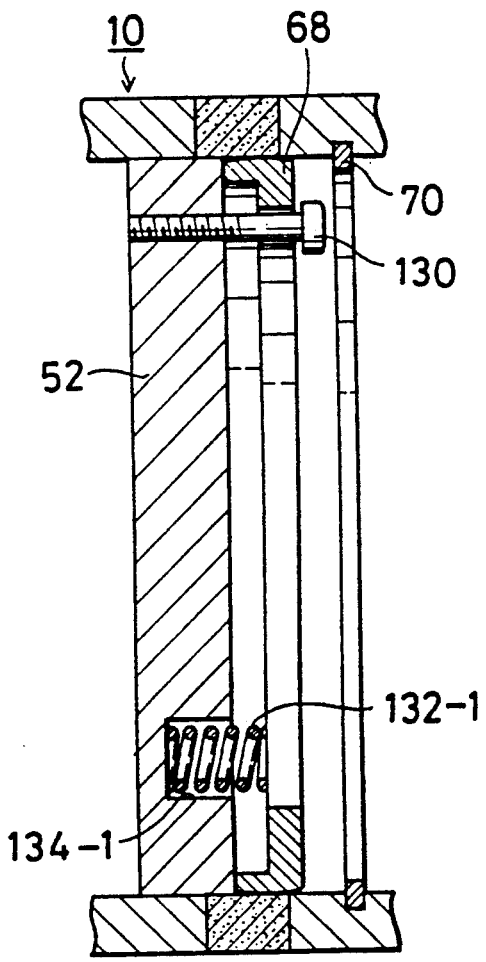
Figure 18:
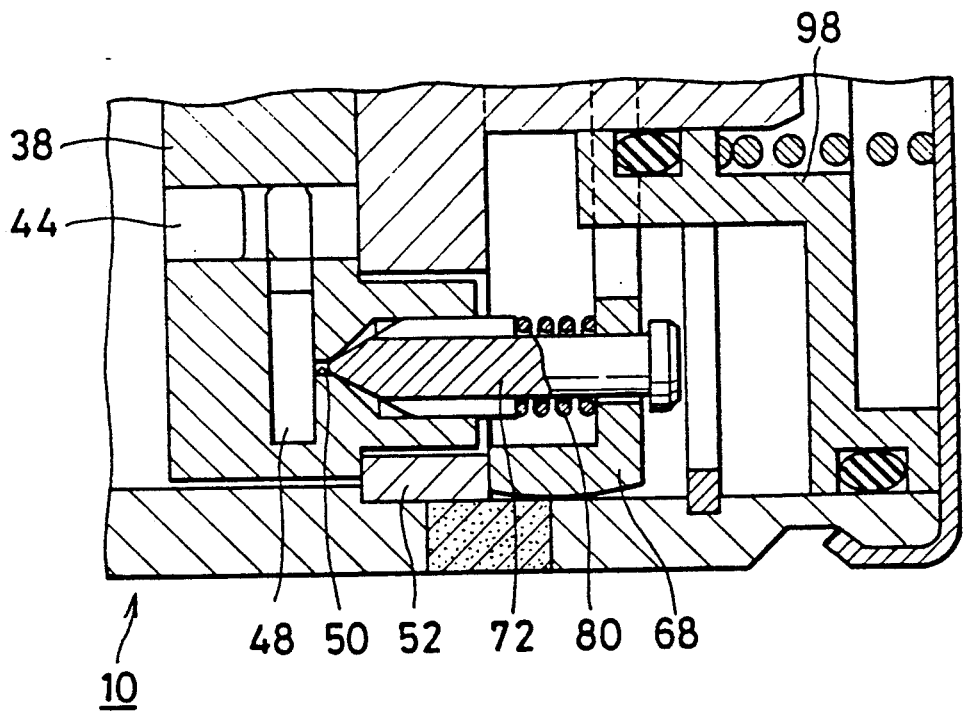
FIG. 18 is a cross-sectional view similar to that of FIG. 16 showing a state in which the joint is locked in the second embodiment.

The operation of the relief valve 72 will now be described. When a weak exciting current is supplied to the solenoid coil 66 so that the force generated by the ring 68 exceeds the load exerted by the spring 80, as shown in FIG. 15B, the ring 68 compresses the spring 132-1 by swinging about the bolts 130, serving as a fulcrum, thereby coming into contact with the retainer 52. Therefore, the relief pressure is established by the predetermined load exerted by the spring 80. If a differential rotation doesn't occur at this time, no oil pressure is generated in the high pressure chamber 48. Therefore, the relief valve 72 closes the orifice 50 as shown in FIG. 18 and the joint is set in the locked state. Namely, by separating the discharge side and the intake side of the pump with the valve member 72, the plungers 32-1 and 32-2 of the pump are fixed relative to the rotor 24, so that a locked state (4WD state) in which the input and output shafts are directly coupled is obtained.

Figure 19:
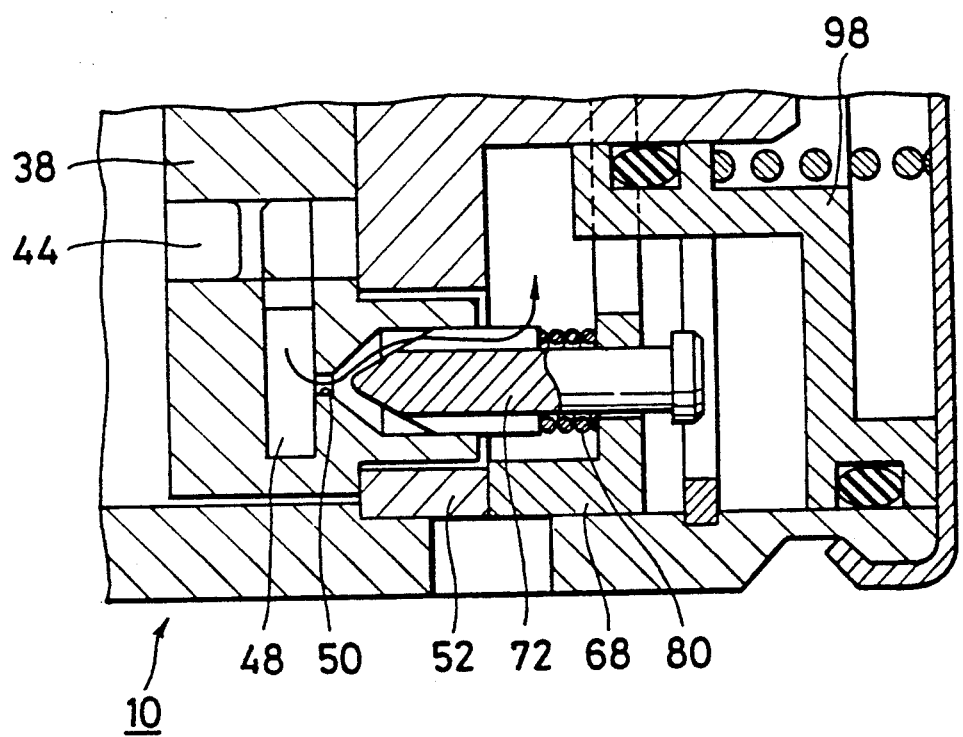
FIG. 19 is a similar cross-sectional view showing the locked state of the orifice in FIG. 18 being released by a pump oil pressure.

When the differential rotation occurs in the locked state and the oil pressure in the high pressure chamber 48 rises and reaches the relief pressure, as shown in FIG. 19, the relief valve 72 moves backward and opens the orifice 50. The torque characteristics according to the curve 202-6 in FIG. 17 which are based on the relief pressure are derived.

Figure 17:
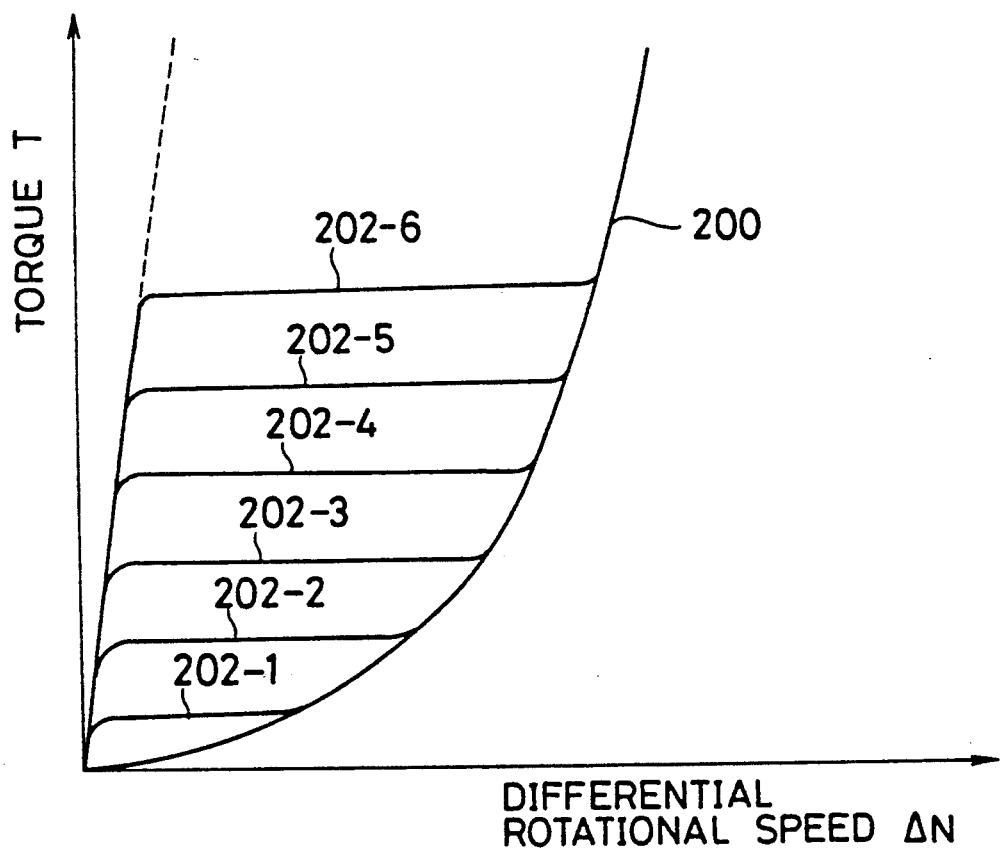
FIG. 17 is a characteristic diagram showing the relation of a transmission torque to a differential rotational speed in the second embodiment.

When a weak exciting current is supplied to the solenoid coil so that a force smaller than the set load of the spring 80 is generated by the ring 68, the torque characteristics are as represented by the curves 202-1 to 202-5 in FIG. 17.

In the second embodiment, the portion of the movable magnetic ring 68 which is not provided with the relief valve 72 is maintained against the retainer 52, so that the electromagnetic driving force required to drive the ring 68 is comparatively small, the solenoid coil 66 can be compact, and the electric power consumption can also be low. Thus, the costs can be small.

Although the relief valve 72 has a needle valve structure using a conical valve member, a spool valve comprising a cylindrical valve member can also be used.

Figure 20:
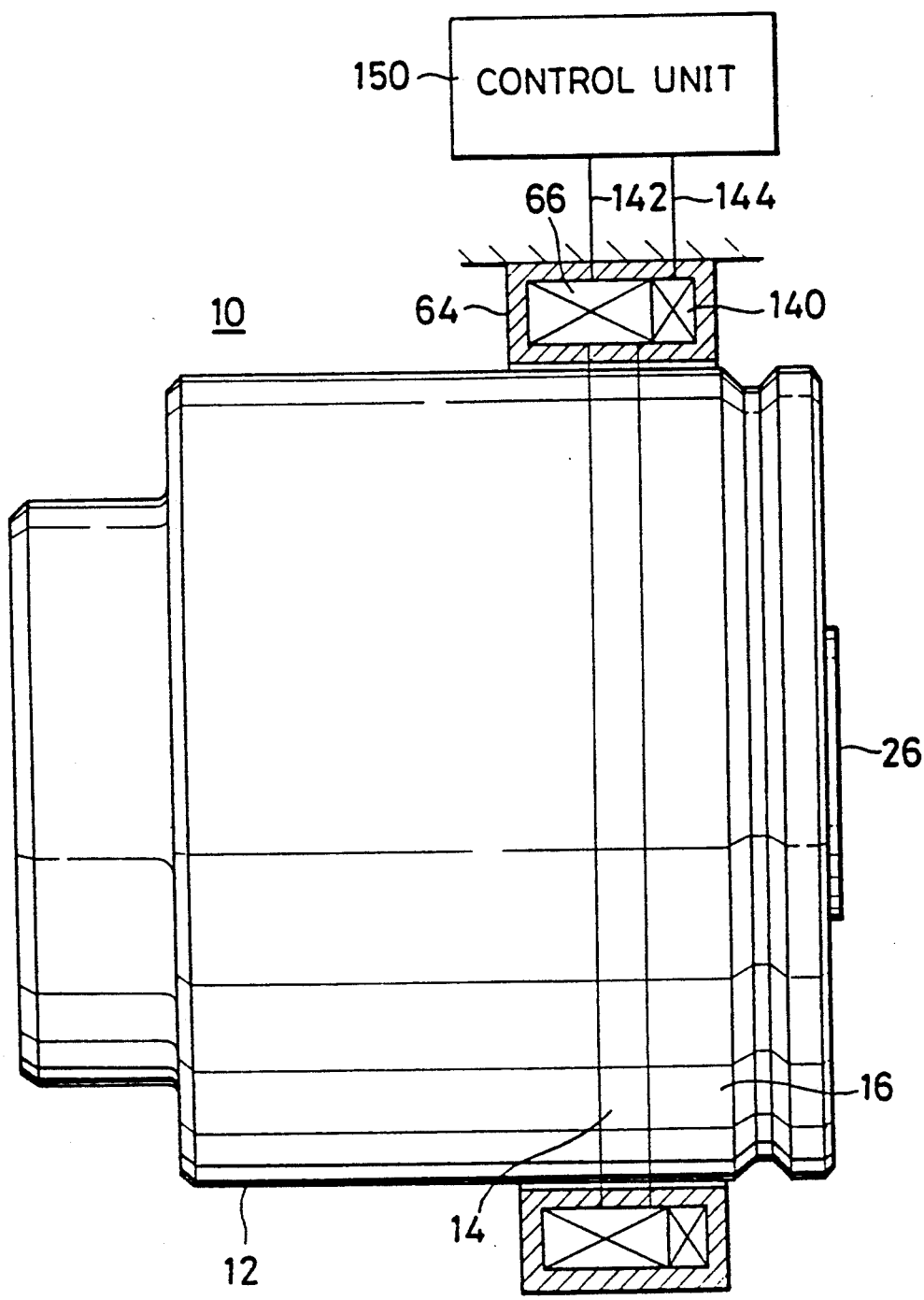
FIG. 20 is a schematic diagram of a control unit according to the present invention.

FIG. 20 shows a control unit of the invention. In addition to the solenoid coil 66 provided in the magnetic frame 64 of the electromagnetic actuator, a detecting coil 140 to detect the position of the magnetic ring and hence the relief valve is also provided. The internal structure of the housing 10 is as shown in FIG. 1 or 12.

The detecting coil 140 detects a change in magnetic flux when the exciting current flowing in the solenoid coil 66 is changed over time, and generates a detection voltage according to changes in the magnetic flux.

The solenoid coil 66 and the detecting coil 140 are connected to a control unit 150 by signal lines 142 and 144. The control unit 150 has a circuit construction shown in FIG. 21.

Figure 21:
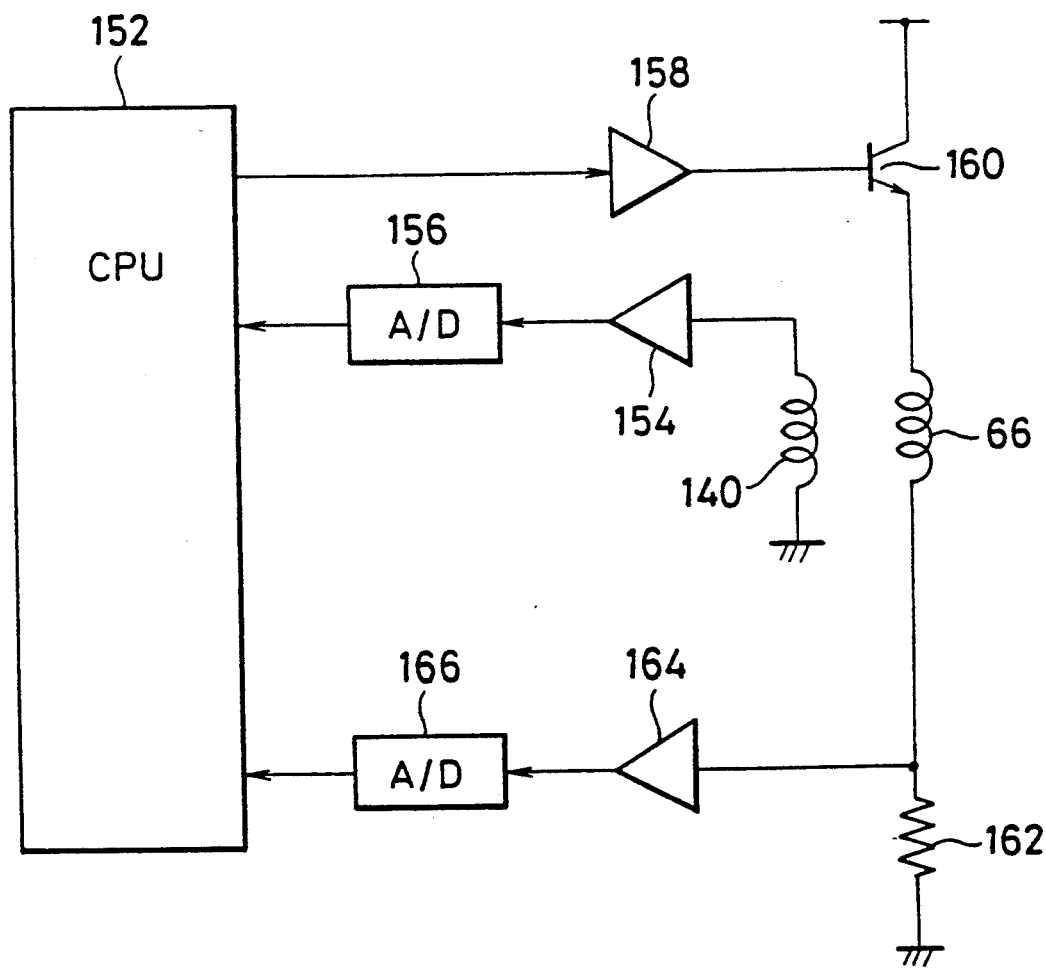
FIG. 21 is a circuit diagram of the control unit shown in FIG. 20.

In FIG. 21, a voltage of the detecting coil 140 is amplified by an amplifier 154 and is converted into a digital signal by an A/D converter 156. After that, the digital signal is supplied to a CPU 152. The CPU 152 discriminates the position of the movable magnetic ring 68 in the housing 10 based on the value of the voltage of the detecting coil 140 as processed by a program.

A control signal from the CPU 152 is amplified by an amplifier 158 and is issued to a base of a transistor 160. The solenoid coil 66 and a current detecting resistor 162 are serially connected to an emitter of the transistor 10. When the CPU 152 turns on a the transistor 160 through the amplifier 158, the exciting current flows in the solenoid coil 66. The exciting current is detected by the current detecting resistor 162 and is amplified by an amplifier 164 and is converted into a digital signal by an A/D converter 166. After that, the digital signal is sent to the CPU 152. Therefore, the CPU 152 knows a value of the current supplied to the solenoid coil 66 by the transistor 160 from the detection voltage of the current detecting resistor 162, and thereby performs a digital-like feedback control to regulate the exciting current to a certain target exciting current.

When considering the structure of FIG. 1 as an example, the magnetic resistance of the magnetic circuit which is formed when the exciting current is supplied to the solenoid coil 66 decreases as the movable magnetic ring 68 is displaced and the gap (amount of air) between the ring 68 and the retainer 52 is reduced.

That is, in the case shown in FIG. 22A, the gap between the ring 68 and the retainer 52 is large and the magnetic resistance is also large. On the other hand, as shown in FIG. 22B, when one side of the ring 68 is inclined into the state in which it contacts the retainer 52, the gap is slightly narrowed and the magnetic resistance is set to a middle value. Further, as shown in FIG. 22C, in the free state in which the ring 68 is in contact with the retainer 52, the gap is minimal and the magnetic resistance is also minimal.

There is a hysteresis in the ring 68 as a result of the operation of the solenoid coil 66.

FIG. 23 shows the hysteresis between the exciting current and the control characteristics. In FIG. 23, when an exciting current $I_1$ is supplied during ordinary operating characteristics (line 170), the ring 68 operates and lock characteristics 172 are obtained. After the lock characteristics 172 have been once obtained, there is obtained a hysteresis such that when the exciting current is reduced to a lower release current $I_2$, ordinary operating characteristics 170 are once again obtained.

When the exciting current $I_5$ is supplied during the lock characteristics (line 172), the movable magnetic ring 68 is moved and free characteristics 174 are obtained. After the free characteristics 174 have been once obtained, there is provided a hysteresis such that when the exciting current is reduced to a lower release current $I_6$ the lock characteristics 172 are once again obtained.

Therefore, when the current which is supplied to the solenoid coil 66 is changed in a range between the exciting currents $I_2$ and $I_5$ with respect to the lock characteristics 172, the lock characteristics 172 are maintained. When the current is changed in a range which is equal to or higher than the exciting current $I_6$ with regard to the free characteristics 174 as well, the lock characteristics can be held and no trouble occurs in the operation of the actuator.

By using such hysteresis characteristics, a lock set current to switch the characteristics, for instance, from the ordinary characteristics 170 to the lock characteristics 172 is set as an exciting current $I_3$ which is equal to or higher than $I_1$ and is lower than $I_5$. On the other hand, a lock holding current after switching to the lock characteristics 172 is set as an exciting current $I_4$ which is equal to or lower than $I_1$ and is larger than $I_2$.

With respect to a range between the lock characteristics 172 and the free characteristics 174 as well, a free set current and a free holding current are similarly established.

On the other hand, although the magnetic flux which is established by the exciting current and the magnetic resistance is applied to the magnetic circuit of the actuator, the change in magnetic flux based on a change in exciting current increases as the magnetic resistance decreases. That is, as shown in FIG. 24, in the case of ordinary characteristics 180 in which the magnetic resistance to a change in exciting current 186 is large, a change in magnetic flux is small and a detection voltage 190 is small. In the case of lock characteristics 182 in which a magnetic resistance to the change in the same exciting current 186 is equal to about a middle value, the change in magnetic flux is equal to about a middle value and a detection voltage 192 is also equal to about a middle value. Further, in the case of free characteristics 184 in which the magnetic resistance is small, a change in magnetic flux to a change in the same exciting current 186 is large and a large detection voltage 194 is derived.

Therefore, by discriminating the voltage of the detecting coil 140 upon changes in the exciting current which is supplied to the solenoid coil 66 by the CPU 152, the position of the movable magnetic ring 68 can be discriminated.

Figure 25A:
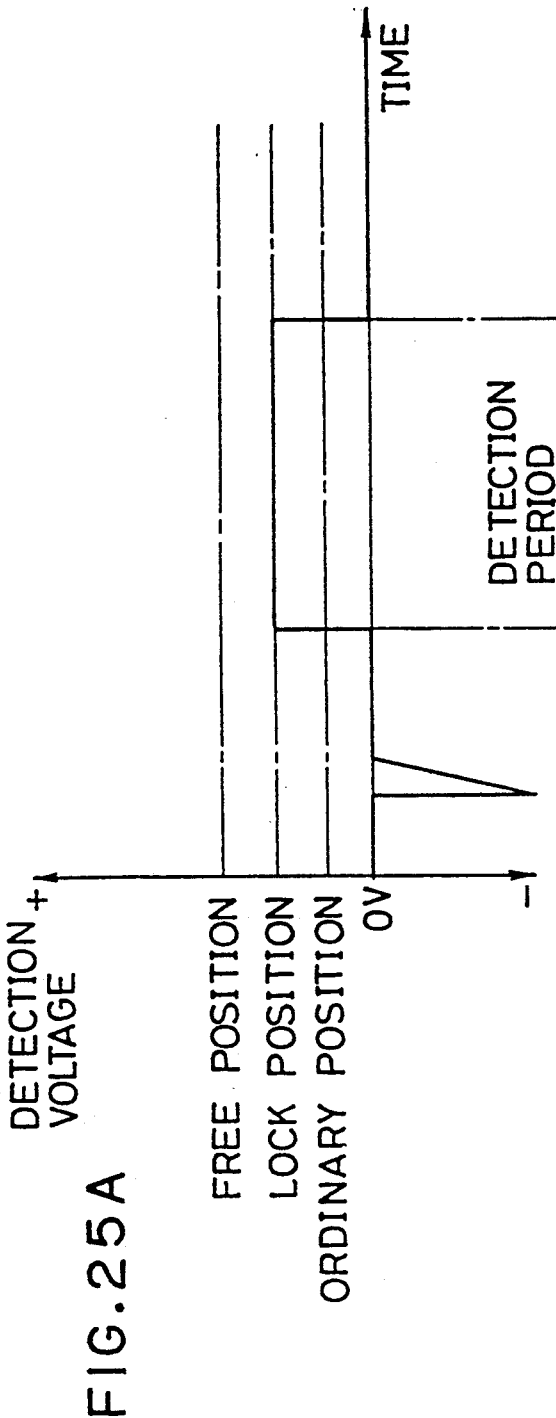
FIGS. 25A and 25B are time charts showing a position detecting operation.
Figure 25B:
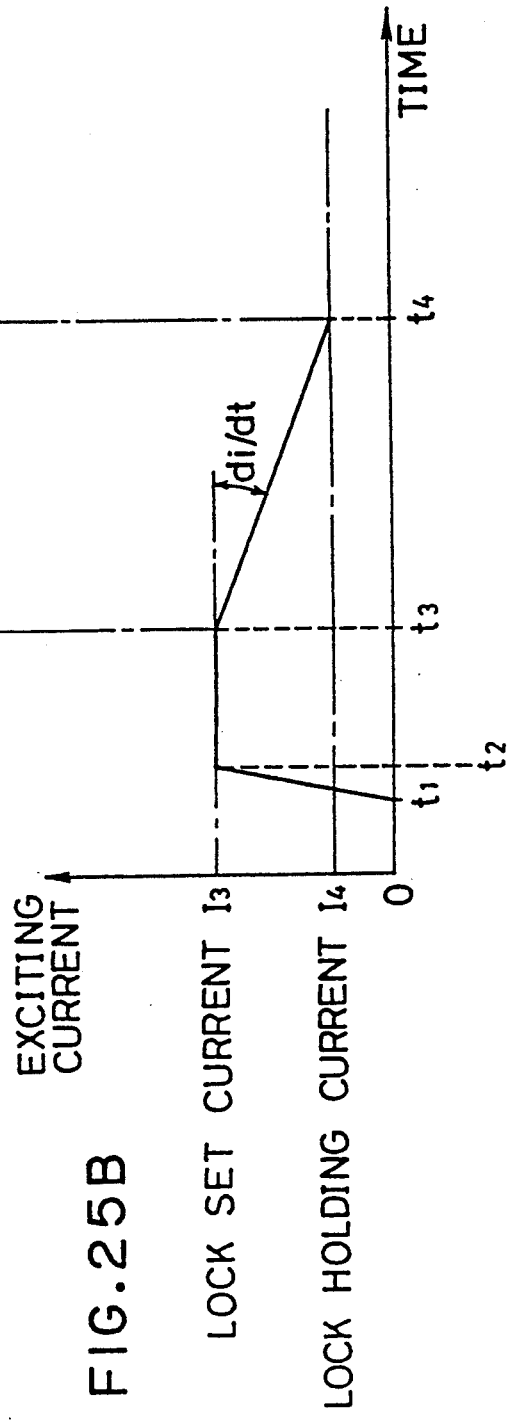

For instance, as shown in FIG. 25B, the exciting current is turned on at time $t_1$, the lock set current $I_3$ is set at time $t_2$, and the characteristics are switched from the ordinary characteristics to the lock characteristics. Subsequently, for a period of time from time $t_3$ to time $t_4$, the current is linearly reduced from the lock set current $I_3$ to the lock holding current $I_4$ at a constant time change rate di/dt. After time $t_4$, the lock holding current $I_4$ is maintained.

In this instance, as shown in FIG. 25A, a detection voltage is generated in the detection coil 140 in accordance with a linear reduction of the exciting current in a period of time between $t_3$ and $t_4$. The detection voltage is obtained as a magnetic flux change which depends on the magnetic resistance of the circuit when the lock characteristics 182 shown in FIG. 24 are in place. The fact that the ring 68 has been moved to the position at which the lock characteristics are provided can be discriminated based on the magnitude of the detection voltage.

As mentioned above, by merely providing the low cost detecting coil 140 in parallel with the solenoid coil 66, the position of the ring 68 can be discriminated with a high degree of reliability.

We claim:

1. A hydraulic power transmission joint comprising:
   a joint main body adapted to couple input and output shafts so as to be rotatable relative to one another;
   a hydraulic pump disposed in the joint main body so as to become operatively interposed between said input shaft and said output shaft at a position at which the pump will be driven by a differential rotation between the shafts, said pump transmitting torque between said shafts, the torque having a characteristic corresponding to pressure of oil generated in the pump;
   a member defining an orifice in a passage connecting a discharge side and an intake side of said hydraulic pump so as to offer resistance to the flow of oil through said pump;
   a relief mechanism including a spring, said relief mechanism having a locking position at which said relief mechanism blocks the orifice, the joint assuming a locked state when oil is prevented from flowing from the discharge side to the intake side of said pump, the ability of said input and output shafts to rotate relative to one another being suppressed when the joint is in said locked state, said spring exerting a load which keeps said orifice blocked while said relief mechanism is in said locking position and until oil pressure at the discharge side of said pump reaches a relief pressure exerting a force on said relief mechanism sufficient to move the relief mechanism off of said orifice,
   an electromagnetic actuator extending around an outer peripheral portion of said joint main body and spaced therefrom so as to out of contact with the joint main body, said electromagnetic actuator including a solenoid coil and generating an electromagnetic fieled acting within said joint main body when an electric current is supplied to said solenoid coil; and
   a driving member supported in the joint main body so as to be movable in an axial direction, said driving member being operatively associated with said electromagnetic actuator so as to receive a driving force produced thereby urging the driving member in said axial direction, the force received by said driving member corresponding to the strength of the electromagnetic field generated by said electromagnetic actuator, and said driving member being operatively connected to said relief mechanism so as to establish said relief pressure with said relief mechanism based on said force received by the driving member.

2. A hydraulic power transmission joint as claimed in claim 1, wherein said driving member is normally oriented perpendicular to said axial direction when there is no driving force produced by said electromagnetic actuator, the magnetic field generated by said coil produces said driving force over the entire periphery of said driving member, said driving member has one circumferential portion supported as a fulcrum, said driving member has another circumferential portion located symmetrically to said fulcrum with respect to an axial center of said driving member, said another circumferential portion is so free to move in said axial direction that said driving member becomes inclined with respect to the normal orientation when a driving force is produced by said electromagnetic actuator, and said another circumferential portion of the driving member is operatively connected to said relief mechanism such that said relief pressure is established by the inclination of said driving member from the normal orientation thereof.

3. A hydraulic power transmission joint as claimed in claim 2, wherein said driving member places said relief mechanism in said locking position when said driving member is inclined to the maximum degree enabled by its support in the main joint body.

4. A hydraulic power transmission joint as claimed in claim 1, wherein said driving member is normally oriented obliquely to said axial direction when there is no driving force produced by said electromagnetic actuator, the magnetic field generated by said coil produces said driving force over the entire periphery of said driving member, said driving member has one circumferential portion supported as a fulcrum, said driving member has another circumferential portion located symmetrically to said fulcrum with respect to an axial center of said driving member, said another circumferential portion is so free to move in said axial direction that said driving member moves toward an orientation perpendicular to said axial direction when a driving force is produced by said electromagnetic actuator, and said another circumferential portion of the driving member is operatively connected to said relief mechanism such that said relief pressure is established by the degree to which said driving member is oriented perpendicular to said axial direction.

5. A hydraulic power transmission joint as claimed in claim 4, wherein said driving member places said relief mechanism in said locking position when said driving member is oriented perpendicular to said axial direction.

6. A hydraulic power transmission joint as claimed in claim 2, wherein said driving member is ring-shaped, and further comprising a supporting spring exerted a force that biases said one circumferential portion of the driving member away from the member defining said orifice, whereby said another circumferential portion is moved in said axial direction while said one circumferential portion is supported as a fulcrum when a driving force is produced by said electromagnetic actuator thereby causing the driving member to become inclined relative to said axial direction.

7. A hydraulic power transmission joint as claimed in claim 3, wherein said driving member is ring-shaped, and further comprising a supporting spring exerting a force that biases said one circumferential portion of the driving member away from the member defining said orifice, whereby said another circumferential portion is moved in said axial direction while said one circumferential portion is supported as a fulcrum when a driving force is produced by said electromagnetic actuator thereby causing the driving member to become inclined relative to said axial direction.

8. A hydraulic power transmission joint as claimed in claim 4, wherein said driving member is ring-shaped, and further comprising a supporting spring exerting a biasing force that biases said another circumferential portion of said driving member away from the member defining said orifice, whereby said another circumferential portion is moved against the force exerted by said supporting spring while said one circumferential portion is supported as a fulcrum when a driving force is produced by said electromagnetic actuator thereby moving said driving member toward the orientation perpendicular to said axial direction.

9. A hydraulic power transmission joint as claimed in claim 5, wherein said driving member is ring-shaped, and further comprising a supporting spring exerting a biasing force that biases said another circumferential portion of said driving member away from the member defining said orifice, whereby said another circumferential portion is moved against the force exerted by said supporting spring while said one circumferential portion is supported as a fulcrum when a driving force is produced by said electromagnetic actuator thereby moving said driving member toward the orientation perpendicular to said axial direction.

10. A hydraulic power transmission joint as claimed in claim 11, and further comprising a free valve disposed in parallel with said orifice between said intake side and said discharge side of said hydraulic pump, said free valve being movable between a first position at which said free valve partitions said discharge side and said intake side of the hydraulic pump from one another and a second position at which said free valve allows oil to pass from said discharge side to said intake side of the hydraulic pump.

11. A hydraulic power transmission joint as claimed in claim 10, wherein said driving member is normally oriented perpendicular to said axial direction when there is no driving force produced by said electromagnetic actuator, the magnetic field generated by said coil produces said driving force over the entire periphery of said driving member, said driving member has one circumferential portion supported as a fulcrum, said driving member has another circumferential portion located symmetrically to said fulcrum with respect to an axial center of said driving member, said another circumferential portion being so free to move in said axial direction that said driving member becomes inclined with respect to the normal orientation when a weak electromagnetic field is generated by said electromagnetic actuator, said one circumferential portion of said driving member moves in said direction when a strong electromagnetic field, greater than that of said weak electromagnetic field, is generated by said electromagnetic actuator, said one circumferential portion of said driving member is operatively connected to said free valve so as to move said free valve to said second position thereof when said strong electromagnetic field is generated by said electromagnetic actuator, and said another circumferential portion of the driving member is operatively connected to said relief mechanism such that said relief pressure is established by the degree to which said driving member is inclined from the normal orientation thereof.

12. A hydraulic power transmission joint as claimed in claim 11, wherein said driving member places said relief mechanism in said locking position when said driving member is inclined to the maximum degree enabled by its support in the main joint body.

13. A hydraulic power transmission joint as claimed in claim 11, wherein said driving member is ring-shaped, and further comprising a supporting spring exerting a force that biases said one circumferential portion of the driving member toward said fulcrum in a direction away from the member defining said orifice, and a weak spring exerting a force that biases said another circumferential portion of said driving member away from the member defining said orifice, the force exerted by said weak spring being weaker than that exerted by said strong spring, whereby said another circumferential portion is moved against the force exerted by said weak spring while said one circumferential portion is supported as a fulcrum when said weak electromagnetic field is generated thereby causing the driving member to become inclined relative to said axial direction, and said ring-shaped member is moved in its entirety against the forces exerted by said strong and said weak springs when said strong electromagnetic field is generated.

14. A hydraulic power transmission joint as claimed in claim 12, wherein said driving member is ring-shaped, and further comprising a strong spring exerting a force that biases said one circumferential portion of the driving member toward said fulcrum in a direction away from the member defining said orifice, and a weak spring exerting a force that biases said another circumferential portion of said driving member away from the member defining said orifice, the force exerted by said weak spring being weaker than that exerted by said strong spring, whereby said another circumferential portion is moved against the force exerted by said weak spring while said one circumferential portion is supported as a fulcrum when said weak electromagnetic field is generated thereby causing the driving member to become inclined relative to said axial direction, and said ring-shaped member is moved in its entirety against the forces exerted by said strong and said weak springs when said spring electromagnetic field is generated.

15. A hydraulic power transmission joint as claimed in claim 12, wherein said electromagnetic actuator is capable of producing a driving force on said driving member that is smaller than the load exerted by the spring of said relief mechanism.

16. A hydraulic power transmission joint as claimed in claim 1, and further comprising a detecting coil constituting a magnetic circuit with said solenoid coil, and discriminating means for discriminating the position of said driving member on the basis of a relation between the current supplied to said solenoid coil and a voltage impressed across said detecting coil.

17. A hydraulic power transmission joint as claimed in claim 16, and further comprising a control unit which decreases the current supplied to said solenoid coil, after said driving member has been driven, to a value sufficient to maintain said driving member in position, said discriminating means discriminating the position of said driving member on the basis of the voltage impressed across said detecting coil in association with the decrease in the current effected by said control unit.

18. In a vehicle, a torque transmission joint which transmits torque between a tire of the vehicle and a power train of the vehicle, said torque transmission joint comprising:

a joint main body, and input and output shafts respectively connected to a wheel on which the tire of the vehicle is mounted and the power train, said shafts being coupled so as to be rotatable relative to one another through said joint main body;

a hydraulic pump operatively interposed between said input shaft and said output shaft so as to be driven by a differential rotation between said shafts, said pump transmitting torque between said shafts, the torque having a characteristic corresponding to pressure of oil generated in the pump;

a member defining an orifice in a passage connecting a discharge side and an intake side of said hydraulic pump so as to offer resistance to the flow of oil through said pump;

a relief mechanism including a spring, said relief mechanism having a locking position at which said relief mechanism blocks the orifice, the joint assuming a locked state when oil is prevented from flowing from the discharge side to the intake side of said pump, the ability of said input and output shafts to rotate relative to one another being suppressed when the joint is in said locked state, said spring exerting a load which keeps said orifice blocked while said relief mechanism is in said locking position and until oil pressure at the discharge side of said pump reaches a relief pressure exerting a force on said relief mechanism sufficient to move the relief mechanism off of said orifice, the load exerted by said spring being at least equal to a force on said relief mechanism produced by pressure generated in pump when the orifice is blocked by the relief mechanism and torque on the tire while running on a rough road is sufficient to cause the tire to begin to slip, and the load exerted by said spring being at most equal to a force on said relief mechanism produced by pressure generated in the pump when the orifice is blocked by said relief mechanism and torque on the tire while running on a paved road is sufficient to cause the tire to begin to slip;

an electromagnetic actuator extending around an outer peripheral portion of said joint main body, said electromagnetic actuator fixed to a portion of the vehicle and spaced from said joint main body so as to be out of contact thereby, said electromagnetic actuator including a solenoid coil and generating an electromagnetic field acting within said joint main body when an electric current is supplied to said solenoid coil; and a driving member supported in the joint main body so as to be movable in an axial direction of said shafts, said driving member being operatively associated with said electromagnetic actuator so as to receive a driving force produced thereby urging the driving member in said axial direction, the force received by said driving member corresponding to the strength of an electromagnetic field generated by said electromagnetic actuator, and said driving member being operatively connected to said relief mechanism so as to establish said relief pressure with said relief mechanism based on said force received by the driving member.

* * * * *